United States Patent
Clark

(10) Patent No.: US 11,022,058 B1
(45) Date of Patent: Jun. 1, 2021

(54) WORK VEHICLE ENGINE CONTROL SYSTEMS OPERABLE IN ENHANCED SCHEDULED POWER REDUCTION MODES

(71) Applicant: Deere & Company, Moline, IL (US)

(72) Inventor: Scott N. Clark, Bettendorf, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 16/853,587

(22) Filed: Apr. 20, 2020

(51) Int. Cl.
| | | |
|---|---|---|
| *F02D 41/04* | (2006.01) | |
| *F02D 41/24* | (2006.01) | |
| *A01D 41/127* | (2006.01) | |
| *A01D 90/10* | (2006.01) | |
| *F02D 41/30* | (2006.01) | |

(52) U.S. Cl.
CPC .......... *F02D 41/04* (2013.01); *A01D 41/127* (2013.01); *A01D 90/10* (2013.01); *F02D 41/2406* (2013.01); *F02D 41/3005* (2013.01); *F02D 2200/101* (2013.01)

(58) Field of Classification Search
CPC .. F02D 41/04; F02D 41/3005; F02D 41/2406; F02D 2200/101; A01D 90/10; A01D 41/127
See application file for complete search history.

(56) References Cited

U.S. PATENT DOCUMENTS

| | | | |
|---|---|---|---|
| 6,725,833 B1 * | 4/2004 | Irihune | F02D 9/1065 |
| | | | 123/399 |
| 7,276,806 B1 | 10/2007 | Sheidler et al. | |
| 7,945,378 B2 | 5/2011 | Sheidler et al. | |
| 8,095,285 B2 | 1/2012 | Schifferer et al. | |
| 8,352,155 B2 | 1/2013 | Schindler et al. | |
| 8,406,981 B2 * | 3/2013 | Tetsuka | F02D 9/02 |
| | | | 701/103 |
| 8,781,694 B1 | 7/2014 | Sheidler et al. | |
| 9,341,125 B2 * | 5/2016 | Goho | F02D 11/105 |
| 9,429,082 B2 | 8/2016 | Holthaus et al. | |

(Continued)

FOREIGN PATENT DOCUMENTS

| | | |
|---|---|---|
| EP | 0507500 A2 | 7/1992 |
| EP | 1306536 A1 | 12/2016 |

*Primary Examiner* — Joseph J Dallo
(74) *Attorney, Agent, or Firm* — Klintworth & Rozenblat IP LLP

(57) ABSTRACT

Work vehicle engine control systems operable in enhanced engine protection (EP) modes, and associated methods and program products, include a memory storing a first default power profile having a first profile shape as expressed on a power/speed graph, which plots power output and engine speed along vertical and horizontal axes, respectively. A controller architecture is coupled to the memory and is operable in the enhanced EP mode in which the controller architecture: (i) generates a first dynamically-adjusted power profile by repeatedly fitting the first profile shape beneath a moving EP ceiling as expressed on the power/speed graph; (ii) utilizes the first dynamically-adjusted power profile to determine a power output target ($PO_{TAR}$) corresponding to a current speed of the work vehicle engine; and (iii) schedules the power output of the work vehicle engine in accordance with the power output target ($PO_{TAR}$).

20 Claims, 6 Drawing Sheets

(56) References Cited

U.S. PATENT DOCUMENTS

| | | | |
|---|---|---|---|
| 9,586,573 B2 | 3/2017 | Sujan et al. | |
| 2003/0084873 A1* | 5/2003 | Ishida | F02D 35/0007 123/399 |
| 2006/0213483 A1* | 9/2006 | Miyachi | F02D 41/107 123/399 |
| 2010/0299048 A1 | 11/2010 | Schindler et al. | |
| 2015/0059693 A1* | 3/2015 | Goho | F02D 31/002 123/399 |
| 2015/0173161 A1* | 6/2015 | Ceccucci | H05B 41/388 315/293 |
| 2015/0198098 A1* | 7/2015 | Blake | F02D 13/0284 123/345 |
| 2015/0307081 A1* | 10/2015 | West | B60W 30/188 701/22 |
| 2016/0218514 A1* | 7/2016 | Takeda | H02J 3/32 |
| 2017/0137019 A1* | 5/2017 | West | B60W 10/06 |
| 2019/0263400 A1 | 8/2019 | Chunodkar et al. | |

\* cited by examiner

WORK VEHICLE ENGINE CONTROL SYSTEMS OPERABLE IN ENHANCED SCHEDULED POWER REDUCTION MODES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle engine control systems operable in enhanced engine protection modes, as well as to related methods and program products.

BACKGROUND OF THE DISCLOSURE

Modern work vehicles are commonly equipped with engine control systems for scheduling engine power output in accordance with a factory-programmed characteristic or profile, referred to herein as a "power bulge profile." Such an engine control system may monitor the output speed of the work vehicle engine; and, for a given output speed, utilize the power bulge profile to convert the engine's current output speed to an ideal power output of the engine (herein, the "power output target" or "$PO_{TAR}$"). The engine control system may then command certain actuated devices to bring the power output of the engine into alignment or conformity with $PO_{TAR}$, to the extent permitted by real world operating conditions. The logic of the engine control system may be executed by a controller, such as an engine control unit (ECU), associated with the work vehicle engine. The actuated devices utilized by the engine control system to vary the engine power output differ between engine platforms, but generally include one or more devices controlling the amount of fuel and oxygen (as determined by air volume, density, and temperature) delivered to the engine's combustion chambers per combustion cycle. By regulating the engine power output of the work vehicle engine in this manner, an engine control system can provide work vehicle operators with a predictable, reliable operating experience, while preserving the ability to rapidly ramp up engine power output on an as-needed basis across the majority of operational scenarios encountered by work vehicles.

SUMMARY OF THE DISCLOSURE

Work vehicle engine control systems operable in enhanced engine protection (EP) modes are provided. In embodiments, the work vehicle engine control system includes a memory storing a first default power profile having a first profile shape as expressed on a power/speed graph. The power/speed graph includes a vertical axis along which power output of the work vehicle engine increases in an upward direction and a horizontal axis along which engine speed increases in a rightward direction. A controller architecture is coupled to the memory and is operable in the enhanced EP mode in which the controller architecture: (i) generates a first dynamically-adjusted power profile by repeatedly fitting the first profile shape beneath a moving EP ceiling as expressed on the power/speed graph; (ii) utilizes the first dynamically-adjusted power profile to determine a power output target ($PO_{TAR}$) corresponding to a current speed of the work vehicle engine; and (iii) schedules the power output of the work vehicle engine in accordance with the power output target ($PO_{TAR}$).

In further embodiments, the work vehicle engine control system includes a memory and controller architecture, which is coupled to the memory and which is operable in an enhanced EP mode. The memory stores a default power bulge profile having a first profile shape as expressed on a power/speed graph. The power/speed graph includes a vertical axis along which power output of the work vehicle engine increases in an upward direction and a horizontal axis along which engine speed increases in a rightward direction. The memory further stores a default power boost profile having a second profile shape as expressed on the power/speed graph. When placed in the enhanced EP mode and a power boost function of the work vehicle is disengaged, the controller architecture (i) generates a dynamically-adjusted power bulge profile by repeatedly fitting the first profile shape beneath a moving EP ceiling as expressed on the power/speed graph, and (ii) utilizes the dynamically-adjusted power bulge profile to determine a power output target ($PO_{TAR}$) corresponding to a current speed of the work vehicle engine. Comparatively, when placed in the enhanced EP mode and the power boost function of the work vehicle is engaged, the controller architecture (i) generates a dynamically-adjusted power boost profile by repeatedly fitting the second profile shape beneath the moving EP ceiling, and (ii) utilizes the dynamically-adjusted power boost profile to determine the power output target ($PO_{TAR}$) corresponding to the current speed of the work vehicle engine. Whether the power boost function is engaged or disengaged, the controller architecture then schedules the power output of the work vehicle engine in accordance with the power output target ($PO_{TAR}$).

Methods and program products associated with work vehicle engine control systems operable in EP modes are further provided. In this regard, further disclosed is a work vehicle program product utilized in conjunction with a work vehicle engine control system. The work vehicle engine control system includes a controller architecture operable in an enhanced EP mode and which is located onboard a work vehicle having a work vehicle engine. In various embodiments, the work vehicle program product includes a non-transitory computer-readable medium. A first default power profile is stored in the non-transitory computer-readable medium and has a first profile shape as expressed on a power/speed graph, which includes a horizontal axis along which engine speed increases in a rightward direction and includes a vertical axis along which power output increases in an upward direction. Computer-readable instructions are further stored on the computer-readable media. When executed by the controller architecture while the work vehicle engine control system is placed in the enhanced EP mode, the computer-readable instructions cause the controller architecture to: (i) generate a first dynamically-adjusted power profile by fitting the first profile shape beneath an EP ceiling intersecting the first default power profile as expressed on the power/speed graph, the first dynamically-adjusted power profile having a curved shape decreasing in slope with increasing engine speed; (ii) utilize the first dynamically-adjusted power profile to determine a power output target ($PO_{TAR}$) corresponding to a current speed of the work vehicle engine; and (iii) schedule the power output of the work vehicle engine in accordance with the power output target ($PO_{TAR}$).

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
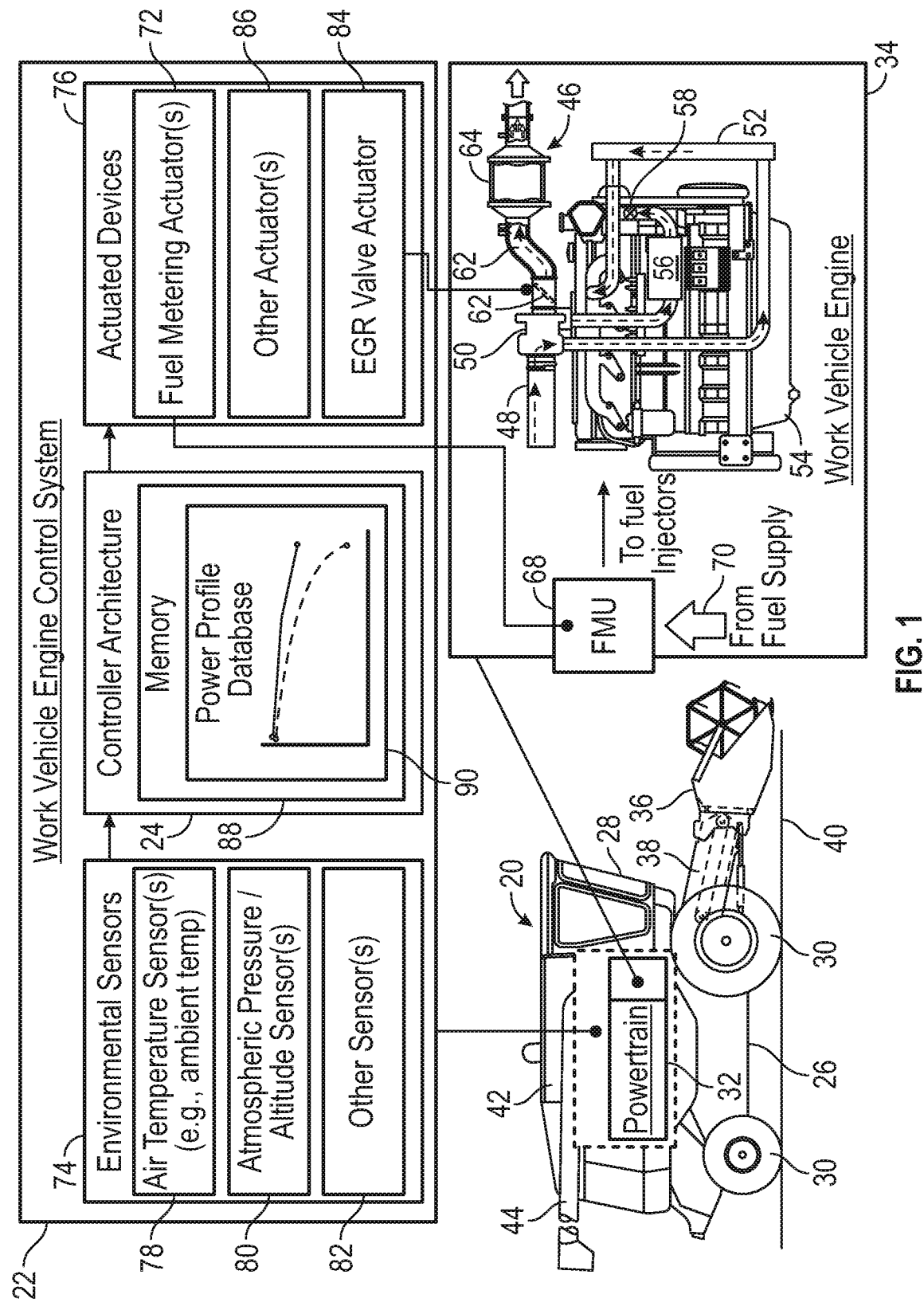
FIG. 1 is a schematic of a work vehicle (here, a combine harvester) equipped with a work vehicle engine control system operable in an enhanced engine protection (EP) mode, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

As appearing herein, the term "fit beneath," as utilized in reference to the relationship between a first profile and a second profile (or point), indicates that the shape of the first profile, when described as "fit beneath" the second profile (or point), does not rise above the second profile (or point), as expressed on a power/speed graph of the type described below. Thus, continuing this example, the term "fit beneath" does not preclude the possibility that the first profile may overlap or coincide with the second profile (or point) at one or more locations on the power/speed graph. Further, the term "engine protection (EP) ceiling" refers to a profile or a point above which the below-described dynamically-adjusted power profiles should not rise when a work vehicle engine control system operates in an EP mode. A dynamically-adjusted power profile may be adjusted (through graphical shift (translation), scaling (compression), or a combination thereof) in conjunction with power-wise movement of an EP ceiling (corresponding to vertical movement of the EP ceiling on the power/speed graph) to ensure that the maximum power output value (or values) of a given dynamically-adjusted power profile does not (or do not) exceed the maximum permissible power output value set by the EP ceiling, as discussed in detail below.

Overview

As noted above, modern work vehicles are often equipped with engine control systems for scheduling engine power output in accordance with a factory-programmed characteristic or profile. When expressed on a power/speed graph plotting output power and engine speed along vertical and horizontal axes, respectively, the factory-programmed profile may have a generally curved shape, which decreases in slope (e.g., has an increasingly negative slope) with increasing engine speed. For this reason, such a factory-programmed characteristic is referred to herein as a "default power bulge profile." As expressed on such a power/speed graph, the default power bulge profile has a fixed position and, thus, spans a fixed power range and a fixed speed range on the power/speed graph. The power output values of the default power bulge profile (and the other profiles discussed herein) may be described in terms of kilowatts (kW), while the engine speed values are described in terms of rotations per minute (RPMs).

In certain instances, a work vehicle may further provide power boost function, which can be engaged to temporarily increase the power output of the work vehicle engine. Such a power boost function may help accommodate significant transient loads or "parasitics" placed on the work vehicle engine due to, for example, the activation of auxiliary, power-demanding function of the work vehicle. As a first example, which is discussed in detail below, a combine harvester may have a power boost function that is automatically engaged when an unloading auger is activated during forward travel of the combine harvester to offload grain from the clean grain tank of the harvester. As second example, a tractor equipped with a power takeoff shaft (PTO) may have a power boost function usefully engaged when the PTO shaft drives a power-demanding implement, such as a baler, towed by the tractor. When the power boost function of a particular work vehicle is engaged, the engine control system may transition from scheduling engine power output in accordance with the above-mentioned default power bulge profile to instead scheduling engine power output in accordance with a secondary profile referred to herein as a "default power boost profile." Relative to the default power bulge profile, the default power boost profile provides an increased or boosted power output target ($PO_{TAR}$) for a given output speed of the work vehicle engine to accommodate temporary increases in engine loading. When the power boost function is subsequently disengaged, the engine control system may then revert to scheduling engine power output in accordance with the default power bulge profile.

The above-described engine scheduling scheme works well across the majority of operating conditions encountered by work vehicles. However, in instances in which environmental extremes materially detract from the combustion efficiency of a work vehicle engine, the usage of such conventional engine scheduling schemes can be problematic. Under such environmental conditions, scheduling engine power output in accordance with a default power bulge profile or a default power boost profile can result in exacerbated wear and potential damage to the work vehicle engine. Such conditions, referred to herein as "engine protection (EP) constraint conditions," generally depress the combustion efficiency of a work vehicle engine due to a decrease in the amount of combustible oxygen content per volume of air, as occurring at higher altitudes (lower atmospheric pressures) and at elevated ambient temperatures. For this reason, certain engine control systems are now configured to operate in a specialized mode, referred to herein as an "EP mode," to protect work vehicle engines against potential damage under EP constraint conditions.

When operating in the EP mode, a work vehicle engine control system imposes an artificial limit over the power output of the work vehicle engine. This limit is referred to as the "EP ceiling" and may be graphically expressed as a profile or characteristic on a power/speed graph. Typically, the EP ceiling can be expressed relatively simple function, such as a linear (straight line) function having a flat (zero) slope or slightly negative slope, as further illustrated and discussed in connection with FIGS. 2-6 below. In contrast to the default power boost profile and the default power bulge profile, the vertical (power-wise) position of the EP ceiling is not fixed on the power/speed graph, but rather moves in conjunction with changing EP constraint conditions. Generally, as the combustive efficiency of the work vehicle engine is further suppressed (e.g., due to increasing ambient temperatures or decreasing atmospheric pressures at higher altitudes), the EP ceiling shifts vertically downward (decreases in power range) and transects an increasingly lower portion of the default power bulge profile. In instances in which the default power boost profile would schedule a higher power output target ($PO_{TAR}$) absent imposition of the EP ceiling for a given engine speed, the EP ceiling overrides the default power boost profile and schedules a reduced power output target ($PO_{TAR}$) for the given engine speed. In so doing, the EP ceiling protects the work vehicle engine from potential damage, while providing a maximum power output permitted under the current EP constraint conditions. As a corollary, the power boost function of the work vehicle (if otherwise provided) is rendered unavailable under EP constraint conditions.

While beneficial from an engine protection standpoint, the above-described approach of imposing an EP ceiling under EP constraint conditions is limited in several respects. First, the imposition of an EP ceiling over the default power bulge profile fundamentally changes the responsiveness and behavior of a work vehicle engine under EP constraint conditions. This change in engine behavior is perceptible to work vehicle operators, particularly as such operators are typically well-attuned to and highly familiar with the behavior of the engine when scheduled in accordance with a default power bulge profile. Engine behaviors may consequently become misaligned with operator expectations when the engine control system operates in the EP mode, with a corresponding degradation in operator satisfaction. Further, it has been traditionally regarded as desirable (and conventional EP scheduling schemes have thus sought) to provide operators with a maximum or peak engine power output permitted under a given set of EP constraint conditions, particularly as scheduled engine power output is already reduced as compared to that provided under standard (non-EP) operating conditions. Surprisingly, however, this premise has been determined to be false or errant for a significant majority of work vehicle operators. Instead, it has been discovered that the conventional practice of providing operators with a maximum engine power output (again, as permitted by the EP ceiling under EP constraint conditions) has several negative outcomes, including detracting from the overall drivability of the work vehicle, promoting undesirable driving behaviors, reducing work vehicle productivity, and further lowering operator satisfaction levels. Finally, reductions in operator satisfaction levels and work vehicle efficiency are also observed due to the unavailability of the power boost function (if normally provided) under EP constraint conditions.

The following describes work vehicle engine control systems, which overcome many, if not all of the above-described limitations associated with conventional engine control systems when operating under EP constraint conditions. Such work vehicle engine control systems operate in improved or enhanced modality under EP constraint conditions; the term "enhanced EP mode," as appearing herein, referring to a mode of operation, activated under EP constraint conditions, in which a work vehicle engine control system generates at least one dynamically-adjusted power profile for usage in scheduling the engine power output. For example, in embodiments, the work vehicle engine control system (or, more specifically, a processing subsystem or "controller architecture" included in the engine control system) may generate a dynamically-adjusted power bulge profile and, perhaps, at least one dynamically-adjusted power boost profile. As indicated by the descriptor "dynamically-adjusted," the dynamically-adjusted power profile(s) are adjusted or modified on an iterative basis by the work vehicle engine control system in response to movement of an EP ceiling. Specifically, as the EP ceiling moves in a power-wise direction (corresponding to a vertical direction on the power/speed graph), the controller architecture of the engine control system iteratively adjusts or modifies (also referred to herein as repeatedly "generating" or "constructing") the dynamically-adjusted power profile(s) to fit beneath the moving EP ceiling. In the context of the enhanced EP mode, the EP ceiling may be expressed on a power/speed graph as a profile or a characteristic, as discussed in detail below; or the EP ceiling can be expressed as a single value denoting a maximum permissible power output above which the maximum power output value (or values) of the dynamically-adjusted power profiles should not rise.

The controller architecture may generate the dynamically-adjusted power profiles by fitting the shapes of the corresponding default power profile(s) beneath the moving EP ceiling utilizing a technique involving shifting (translation), scaling (compression), or a combination thereof. Consider, for example, an embodiment in which the controller architecture generates a dynamically-adjusted power bulge profile by fitting the profile shape of the default power bulge profile beneath an EP ceiling, here exclusively by vertical translation or shift. The peak or maximum power output value of the dynamically-adjusted power bulge profile may be located on or immediately beneath the EP ceiling. In such an embodiment, the dynamically-adjusted power bulge profile is generated to have a shape matching that of the default power bulge profile, while further having a variable vertical (power-wise) position as expressed on the power/speed graph that is repeatedly modified by the controller architecture to maintain the dynamically-adjusted power bulge profile below the moving EP ceiling. Comparatively, in implementations in which the controller architecture applies scaling (in addition or in lieu of shift) to maintain the dynamically-adjusted power bulge profile below the moving EP ceiling, the shape of the dynamically-adjusted power bulge profile may be, in essence, a vertically-compressed version of the profile shape of the default power bulge profile as expressed on the power/speed graph. Similarly, in embodiments, the controller architecture of the engine control system may likewise generate a dynamically-adjusted power boost profile by fitting the profile shape of the default power boost profile beneath the moving EP ceiling by shifting (translation), scaling (compression), or a combination thereof.

Operation of a work vehicle engine control system in an enhanced EP mode of the type described herein provides several notable advantages. First, as the shape of the default power boost profile is generally preserved (although compressed in certain instances), the behavior of the work vehicle engine under EP constraint conditions is brought into greater consistency or harmony with the behavior of the work vehicle engine under standard operating (non-EP constraint) conditions. The behavior of the work vehicle engine under EP constraint conditions thus more closely match operator expectations to improve overall operator satisfaction levels. Here, it may be observed that the usage of a dynamically-adjusted power bulge profile (as opposed to the conventional usage of the EP ceiling) to schedule engine power output results in scheduling still lower engine outputs than would otherwise be scheduled under EP operating conditions (which already reduces engine output to avoid engine damage, as previously discussed). Counter-intuitively, this has been discovered to improve operator satisfaction levels by generally preserving the shape of the default power bulge profile and, therefore, extending the operator-accustomed behavior of the work vehicle engine to EP constraint conditions (albeit at lowered power output levels), as just mentioned. Additionally, the practice of scheduling engine output power utilizing a dynamically-adjusted power bulge profile (such that a maximum permissible power output is often not provided at a given engine speed under EP conditions) has the benefit of opening a vertical (power-wise) gap or bandwidth between the dynamically-adjusted power bulge profile and the EP ceiling. This newly-availed power bandwidth encourages favorable driving behaviors on behalf of work vehicle operators and also improves the overall drivability of the work vehicle for reasons discussed below. Finally, as an additional benefit in embodiments in which the engine control system generates a dynamically-adjusted power boost profile in addition to the dynamically-adjusted power bulge profile, the power boost function of the work vehicle (when applicable) may be preserved under EP constraint conditions to bring about still further improvements in work vehicle efficiency and operator satisfaction levels.

An example embodiment of a work vehicle engine control system will now be described in conjunction with FIGS. 1-7. Specifically, an example work vehicle (here, a combine harvester) equipped with the work vehicle engine control system is described below in connection with FIG. 1, while example processes that may be carried-out by embodiments of the engine control system are described below in connection with FIGS. 2, 3, and 5-7. While the following discussion focuses on a particular type of work vehicle, it is emphasized that embodiments of the engine control system can be beneficially incorporated into various types of work vehicles operated under EP constraint conditions, including work vehicles employed in the agricultural, mining, forestry, and construction industries.

Example Work Vehicle Engine Control System Operable in an Enhanced EP Mode

Referring initially to FIG. 1, an example work vehicle (here, an agricultural combine or "combine harvester" 20) equipped with an example engine control system 22 is presented. As described more fully below, the example work vehicle engine control system 22 includes a processing subsystem or "controller architecture" 24 operable in an enhanced EP mode. The work vehicle engine control system 22 normally operates in a standard operational mode and transitions into the enhanced EP mode in response to detection of EP constraint conditions. Operation of the work vehicle engine control system 22 in the enhanced EP mode is discussed below in connection with FIGS. 2-7. First, however, the combine harvester 20 is described in greater detail to establish a non-limiting example context in which embodiments of the work vehicle engine control system 22 may be better understood.

In addition to the work vehicle engine control system 22, the combine harvester 20 includes a body or chassis 26, a cabin 28 located at or adjacent a forward portion of the chassis 26, and an operator station enclosed by the cabin 28. The harvester chassis 26 is supported by a number of ground-engaging wheels 30. The wheels 30 of the work harvester chassis 26 are driven through a powertrain 32 including a work vehicle engine 34, an example of which is illustrated in greater detail in a lower right region of FIG. 1. A standard header or grain platform 36 is mounted to a feederhouse 38, which projects from the leading end of the combine harvester 20 in a forward direction. As the combine harvester 20 travels over a field 40, crop plants are severed by the grain platform 36, taken into the feederhouse 38, and processed in subsequent sections of the harvester 20. Clean grain is delivered via a to a clean grain tank 42 via non-illustrated clean grain elevator contained within a central portion of the combine harvester 20. The clean grain collected within the clean grain tank 42 can be offloaded from the combine harvester 20, perhaps while the combine harvester continues to travel over the field 40 in a forward direction, utilizing an unloading auger 44. During offloading of the clean grain, the unloading auger 44 is driven by the work vehicle engine 34 through a non-illustrated mechanical connection.

In the example of FIG. 1, the work vehicle engine 34 assumes the form of a heavy-duty diesel engine including an Exhaust Gas Recirculation (EGR) system 46. In other embodiments, the work vehicle engine 34 may assume a different form, such as a non-diesel internal combustion engine or a diesel engine lacking an EGR system, depending upon the particular type of work vehicle within which the work vehicle engine 34 is installed. The particular devices utilized by the engine control system 22 to vary the power output of the work vehicle engine 34 will also vary depending upon the engine platform and physical engine characteristics at issue. In this regard, the various mechanisms and techniques for controlling the power output of work vehicle engines are well-understood in the relevant industries. Thus, the following description regarding the particular manner in which the engine control system 22 may modify the power output of the work vehicle engine 34 during operation of the combine harvester 20 should be understood as merely illustrative or exemplary.

When provided, the EGR system 46 may reduce nitrous oxide (NOX) and other contaminants in the exhaust generated during operation of the work vehicle engine 34. In the illustrated example, the EGR system 46 includes an air intake duct 48, which supplies ambient air to the inlet of a waste-gated turbocharger (WGT) 50. The WGT 50 discharges compressed air through a first conduit to an air-to-air cooler section 52. A second conduit draws exhaust from the engine core 54 of the work vehicle engine 34, which is cooled utilizing an EGR cooler 56. A control valve 58 is positioned in flow series with (e.g., downstream of) the EGR cooler 56 to regulate exhaust flow therethrough. After passing through the control valve 58, the cooled exhaust mixes within a bifurcated conduit 60 with the relatively cool airflow provided by the air-to-air cooler section 52. The bifurcated conduit 60 then directs the exhaust-air mixture into the intake manifold of the engine core 54. The exhaust temperature is decreased as a result, while oxygen levels within the exhaust-air mixture are optimized. In instances in which further emissions control is sought, the EGR system 46 may also include components supporting selective catalytic reduction (SCR) of particulate matter entrained in the exhaust. In this regard, exhaust may be received from the engine core 54, directed through a conduit 62, and into a diesel oxidation catalyst (DOC) chamber 64 for contact with a suitable catalyst. An exhaust throttle valve 66 may be positioned in the conduit 62 to regulate the flow of exhaust to the DOC chamber 64. The treated exhaust from the DOC chamber 64 then flows to a non-illustrated reactor chamber in which the desired SRC reaction occurs prior discharge of the exhaust from the combine harvester 20.

In addition to the above-described EGR system 46, the work vehicle engine 34 contains various other components commonly integrated into work vehicle engines or powertrains. Such components may include non-illustrated fuel injectors and a fuel metering unit (FMU) 68, which is fluidly coupled to the fuel injectors. Specifically, the FMU 68 is positioned upstream of the fuel injectors; and, as indicated by an arrow 70, meters liquid fuel drawn from a fuel tank onboard the combine harvester 20 prior to delivery of the metered fuel to the fuel injectors for spray delivery into the engine combustion chambers. The FMU 68 may include or cooperate with a metered high pressure pump (e.g., an axial piston) pump to provide this functionality in embodiments. Additionally, the FMU 68 may contain a valve element (e.g., a translating spool), which can be positioned utilizing a valve actuation included in a number of actuated devices 72 for controlling the power output of the work vehicle engine 34, as discussed more fully below. Similarly, either or both of the valves 58, 66 contained in EGR system 46 may be modulated by corresponding valve actuators, which may be included in the actuated devices 72 in embodiments of the work vehicle engine control system 22.

The example work vehicle engine control system 22 includes one or more environmental sensors 74 in addition to the above-mentioned actuated devices 76 and the controller architecture 24. The environmental sensors 74 included in the work vehicle engine control system 22 may include sensors for monitoring any environmental parameter affecting combustion within the engine 34, such as any environmental parameter impacting the oxygen content supplied to the combustion chambers of the work vehicle engine 34 per combustive cycle. Such environmental parameters may include the current ambient temperature, as measured by one or more air temperature sensors 78; the local atmospheric pressure, as measured directly by pressure sensor(s) 80 or as inferred by sensors providing data indicative of altitude; or any other sensors 82 measuring a similar parameter influencing the combustion within the combustion chambers of the work vehicle engine 34.

As further included in the work vehicle engine control system 22, the actuated devices 76 can include any number and type of devices capable of materially influencing the power output of the work vehicle engine 34 in a controllable manner. Generally, such actuated devices 76 will influence engine output by varying at one least parameter affecting: (i) one or more properties of the air (e.g., oxygen content, density, volume, and/or temperature) drawn into the combustion chambers of the work vehicle engine 34, and/or (ii) the volume of fuel injected into the combustion chambers per combustion cycle. In this latter regard, and as indicated above, the actuated devices 76 may include one or more fuel metering actuators 72, which may alter the rate or schedule of the metered fuel supplied to the fuel injectors of the work vehicle engine 34 through metering valve modulation. Additionally or alternatively, the actuated devices 76 may include an EGR valve actuator 84 affecting the degree to which cooled exhaust gas is recycled to the combustion chambers of the work vehicle engine 34 or otherwise impacting the oxygen content (and temperature) of the air/exhaust gas mixture ultimately supplied to the combustion chambers. Finally, the actuated devices 76 can include any other type of actuation device, which, in response to commands received from the controller architecture 24, is capable of materially varying the power output of the work vehicle engine 34.

Describing now the controller architecture 24 in greater detail, the controller architecture 24 is associated with a computer-readable memory 88 and may communicate with the various illustrated components over wired data connections, wireless data connections, or any combination thereto; e.g., the controller architecture 24 may communicate with many or all of the illustrated components over a vehicle bus, such as a controller area network (CAN) bus. The term "controller architecture," as appearing throughout this document, is utilized in a non-limiting sense to generally refer to the processing architecture of the work vehicle engine control system 22 (or other work vehicle engine control system). The controller architecture 24 can encompass or may be associated with any practical number of processors, individual controllers, computer-readable memories, power supplies, storage devices, interface cards, and other standardized components. The controller architecture 24 may also include or cooperate with any number of firmware and software programs or computer-readable instructions designed to carry-out the various process tasks, calculations, and control functions described herein. Such computer-readable instructions may be stored within a non-volatile sector of the memory 88 associated with (accessible to) the controller architecture 24. While generically illustrated in FIG. 1 as a single block, the memory 88 can encompass any number and type of storage media suitable for storing computer-readable code or instructions, as well as other data utilized to support the operation of the engine control system 22. The memory 88 may be integrated into the controller architecture 24 in embodiments as, for example, a system-in-package, a system-on-a-chip, or another type of microelectronic package or module.

The memory 88 further stores a power profile database 90 containing at least one default power profile. In the illustrated example, specifically, the power profile database 90 contains at least a default power bulge profile and a default power boost profile. Stated more specifically, the memory 88 may contain data from which the shape and the fixed placement of the default power bulge profile and the default power boost profile, as expressed on a power/speed graph of the type described below, can be determined. Such profiles can be stored as a single function when appropriate (see, for example, the default power bulge profile 98 discussed below), as multiple functions when appropriate (see, for example, the default power boost profile 96 discussed below), as sets of power-speed values, as start point and end port coordinates when a particular profile is a linear (straight line) function, or utilizing any other suitable data structure. The power profile database 90 may also contain data defining aspects of the EP ceiling (e.g., a slope of EP ceiling if assuming the form of a linear function having a non-zero slope, as described below) and possibly other data useful in performing the processes described below in connection with FIGS. 2-7.

Figure 2:
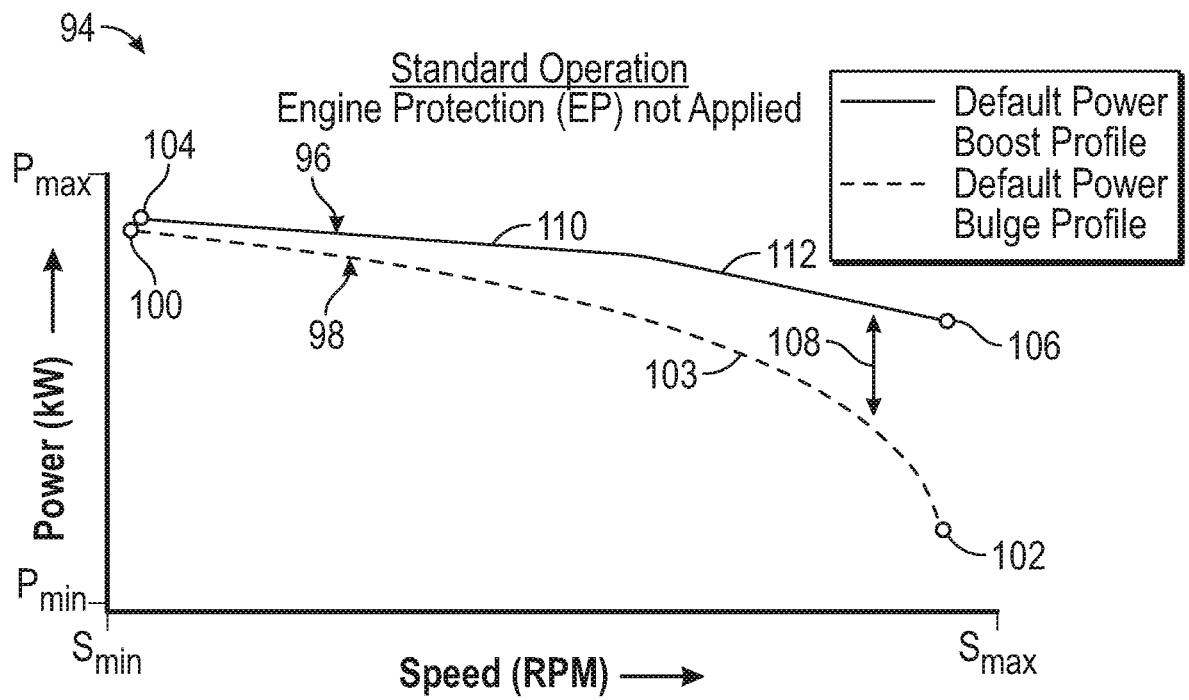
FIG. 2 is a power/speed graph of engine power output (plotted along the ordinate or vertical axis of the graph) versus engine speed (plotted along the abscissa or horizontal axis) setting-forth a default power bulge profile and a default boost profile, which may be selectively utilized to schedule engine power output under standard operating (non-EP constraint) conditions.

Referring now to FIG. 2, a power/speed graph 94 plotting an example default power bulge profile 98 and an example default power boost profile 96 is shown. Engine power output is plotted along the vertical axis of the power/speed graph 94 and may be expressed in units of kW, as calculated using the torque appearing at the engine output shaft multiplied by a time component. In this regard, it will be appreciated that all discussions herein related to the power output of a work vehicle engine (e.g., the work vehicle engine 34) as compared to engine speed for the various profiles described throughout this document can readily be converted to output torque versus engine speed profiles, if so desired, without departing from the scope of the present disclosure. In the context of the illustrated power/speed graph 94, the plotted engine power output range extends from a minimum power output ($P_{min}$) to a maximum power output ($P_{max}$). The particular values of $P_{min}$ and $P_{max}$ will vary between embodiments and engine platforms, but may be about 170±50 kW and 190±50 kW, respectively, in one non-limiting embodiment. Comparatively, engine speed is plotted along the horizontal axis of the power/speed graph 94, expressed in terms of RPM, and extends from a first value ($R_{min}$) to a second value ($R_{max}$) over the plotted range. Again, the particular values of $R_{min}$ and $R_{max}$ will vary between embodiments, but may be 1700±100 RPM and 1900±100 RPM, respectively, in one non-limiting example.

As appearing herein, the term "profile" refers to a characteristic or trace that can be graphically expressed on a two dimensional power-versus-speed (or torque-versus-speed) graph, such as the example power/speed graph 94 shown in FIG. 2, with the profile having a single power (or torque) value for each speed value over the length of the profile. A given profile can thus have any shape, whether that of a curve (see the default power bulge profile 98 as an example), that of a linear (straight line) function, that of a piecewise function (see the default power boost profile 96 as an example), or a more complex (e.g., W-shaped) geometry in embodiments. As noted above, particular profile can be stored in the memory 88 as a function, as multiple functions (if the profile is piecewise or composed of multiple distinct segments), as sets of coordinates, or in any other suitable manner.

As graphically depicted in FIG. 2, the default power bulge profile 98 represents a factory-programmed profile for scheduling engine power output under standard operating (non-EP constraint) conditions. The default power bulge profile 98 is referred to as a "power bulge profile" in reference to the relatively pronounced curvature or downward slope followed by the profile 96 when moving from its illustrated start point 100 to its illustrated end point 102, particularly over the mid-region 103 of the profile 98. Here, the term "illustrated start point" and "illustrated end point" are utilized to indicate that the default power bulge profile 98 may extend beyond the illustrated segment of interest shown in FIG. 2 by some extent, although any extension of the default power bulge profile 98 beyond the illustrated end point 102 will typically be nominal; this sentence also applying to the other profiles discussed herein. Accordingly, the default power bulge profile 98 (at least that section shown in FIG. 2) may be described as having a curved shape possessing a non-positive slope over its entirety or substantial entirety, with the slope of the profile 96 becoming increasingly negative (following an increasingly steeper decline) moving from the illustrated start point 100 to the illustrated end point 102. Consequently, progressing from the illustrated start point 100 of the default power bulge profile 98 toward the illustrated end point 102, relatively large variants in engine speed will yield relatively minor variations in scheduled engine power output at lower RPMs near $S_{min}$. Conversely, relatively minor variations in engine speed will result in relatively pronounced variations in scheduled engine power output at higher RPMs approaching $S_{max}$. The position of the default power bulge profile 98 is fixed such that the power range spanned by the profile 98 does not vary, as is also the case for the below-described default power boost profile 96.

As further depicted on the power/speed graph 94 (FIG. 2), the default power boost profile 96 represents a factory-programmed power profile over which the engine output power is increased or "boosted" for a given speed range. Accordingly, the power output value for each speed value over the range of the default power boost profile 96 may be greater than the power output value of the default power bulge profile 98 for the same speed value. Further, the disparity in the power output values of the default power boost profile 96 may generally increase when moving from the illustrated start point 104 toward the illustrated end point 106 of the profile 98, as indicated in FIG. 2 by a double-headed arrow 108. As briefly indicated above, the default power boost profile 98 has a piecewise geometry in the illustrated example; here, an angled, two segment structure composed of first and second line segments 110, 112, with the first segment 110 assuming the form of a line segment having a first constant negative slope, and the second segment 112 similarly assuming the form of a line segment having a second constant negative slope less than (steeper) the first constant negative slope. In other embodiments, the default power boost profile 96 may have a more basic shape (e.g., that of a single line segment or a gently curved line) or a more complex shape, such as a piecewise function having three or more segments or pieces.

When applicable, the default power boost profile 96 may be utilized in the context of work vehicles having a power boost function, which is selectively engaged due to operator commands and/or automatically (that is, without requiring operator input) in response to certain conditions. In this latter regard, the controller architecture 24 (which may consist of or include an ECU) may automatically engage the power boost function (and thus schedule engine power output under normal (non-EP) operating conditions in accordance with the default power boost profile 96) when an auxiliary function places a substantial additional load or parasitic on the work vehicle engine 34. For example, in the case of the combine harvester 20, the controller architecture 24 may automatically engage the power boost function during usage of the unloading auger 44 in offloading harvested grains from the clean grain tank 42 of the combine harvester 20. In other embodiments, the host work vehicle may not have such a power boost function, in which case a default power boost profile may not be stored in the memory 88 or otherwise utilized. It is also possible to store multiple default power boost profiles (and to generate multiple dynamically-adjusted power boost profiles, as described below) in further embodiments to provide a range of profiles to select amongst in accordance with the severity of the parasitic load placed on the work vehicle engine 34 at a given juncture in time.

The above-described engine scheduling scheme works well under standard operating conditions, as previously discussed. However, under non-standard operating conditions, such as EP constraint conditions, scheduling engine power output in accordance with the default power bulge profile 98 and, particularly in accordance with the default power boost profile 96, can result in rapid wear and potential damage to the work vehicle engine 34. Such non-standard operating conditions or "EP constraint conditions" may occur when the ambient temperature becomes highly elevated and/or the work vehicle is operated under high altitude (low atmospheric pressure) conditions. When such EP constraint conditions occur, particularly when such conditions occur in combination, operation of the work vehicle engine 34 in accordance with either of profiles 96, 98 can result in accelerated engine wear and potential damage, particularly as the work vehicle engine 23 operates at lower engine speeds closer to $S_{min}$ than to $S_{max}$. For this reason, certain manufacturers impose protective countermeasures referred to as EP measures under such EP constraint conditions, as discussed briefly above and further discussed more detail below in connection with FIG. 3. In one non-limiting example, operation of a work vehicle at temperatures exceeding about 35 degrees Celsius and an altitude above sea level exceeding about 1600 meters may be sufficient to trigger operation of an engine control system in an EP mode. In other instances, different values of such parameters, considered in combination or in isolation, may be sufficient trigger EP mode operation.

Figure 3:
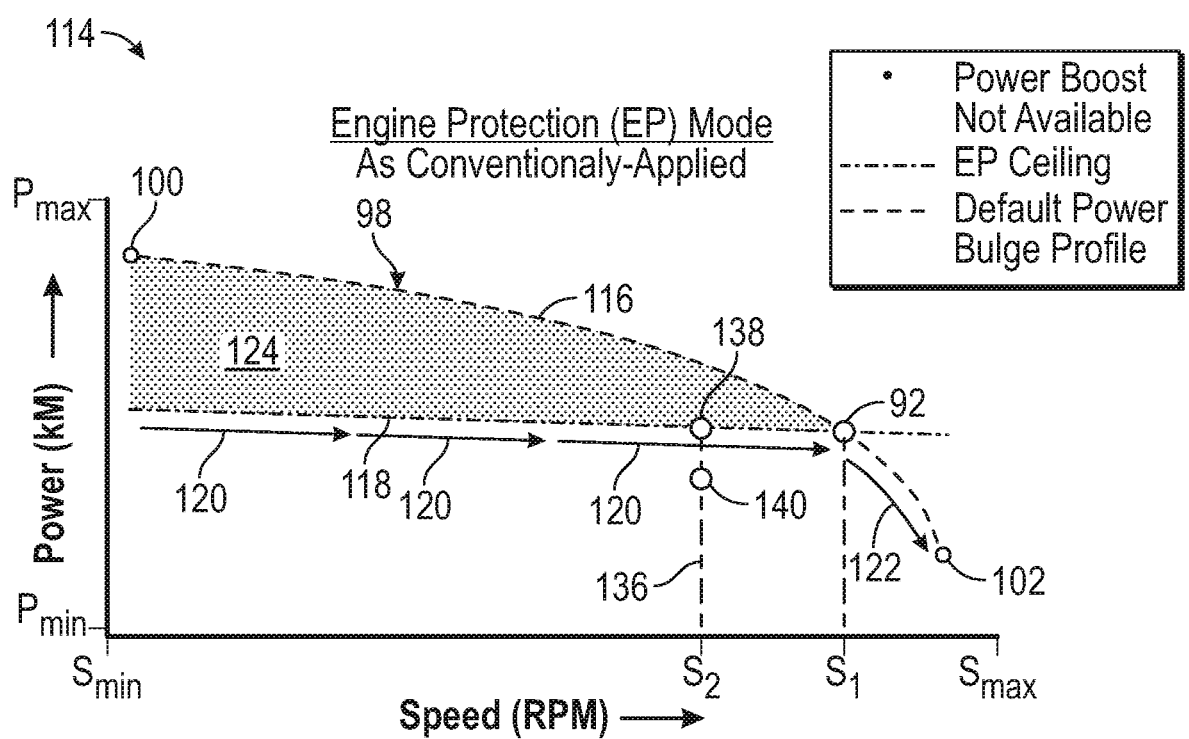
FIG. 3 is a power/speed graph of engine power output (vertical axis) versus engine speed (horizontal axis) illustrating a conventional approach of imposing an EP ceiling over the default power bulge profile (FIG. 2) under EP constraint conditions, while the default power boost profile is rendered unavailable.

Turning now to FIG. 3, a power/speed graph 114 is presented to generally illustrate one manner in which EP protection may be imposed under EP constraint conditions in accordance with a conventional approach. For consistency of explanation, the default power boost profile 96 is carried over from FIG. 2, although it will be appreciated that the upper dashed portion 116 of the default power boost profile 96 is effectively eliminated or rendered unavailable for usage in the example scenario of FIG. 3 for reasons explained below. Comparatively, the default power boost profile 96 is not shown on the power/speed graph 114 as the power boost function is wholly deactivated or rendered unavailable when the engine control system operates in a conventional EP mode. In this example, an EP ceiling profile 118 has been superimposed onto the power/speed graph 114 at a location intersecting the default power boost profile 96. The EP ceiling profile 118 (hereafter, simply referred to as the "EP ceiling 118") has a substantially linear (straight line) geometry in the illustrated example, and may extend purely horizontally (zero slope) or instead possess a slight negative slope as shown. In other instances, the EP ceiling 118 may have a different shape or orientation. In contrast to the default power bulge profile 98, the positioning of the EP ceiling 118 is not fixed on the power/speed graph 114, but rather can move vertically (power-wise) as the EP constraint conditions vary. In embodiments, the controller architecture 24 determines the vertical positioning of the EP ceiling 118 as a function of sensor data, such as sensor data received from the environmental sensors 74, indicative of environmental parameters affecting combustion within the work vehicle engine 34; e.g., the current ambient temperature and ambient air characteristics (e.g., local atmospheric pressure, whether measured directly or inferred from altitude). Generally, as combustive efficiency is suppressed by such parameters (e.g., as ambient temperature increases and/or as atmospheric pressure decreases), this will be reflected by downward movement or descension of the EP ceiling 118 on the power/speed graph 114.

By the nature of the EP protection process, the power output target ($PO_{TAR}$) cannot exceed the EP ceiling profile 118 under EP constraint conditions. Therefore, moving from $S_{min}$ toward $S_{max}$, the scheduled engine power output necessarily follows the EP ceiling 118 with increasing engine speed until reaching a cross-over point 94 at which the default power bulge profile 98 falls below the EP ceiling 118. In the illustrated example, this occurs at a speed $S_1$. Accordingly, at engine speeds between $S_{min}$ and $S_1$, the scheduled engine output follows the EP ceiling 118 (as indicated by a series of arrows 120 in FIG. 3); and, at engine speeds between $S_1$ and $S_{max}$, the scheduled engine output follows the remaining portion of the default power bulge profile 98 located beneath the EP ceiling 118 (as indicated by an arrow 122). Beneficially, this protective power output scheduling scheme generally ensures that the engine power output remains sufficiently limited to prevent exacerbated wear or potential damage to the engine, despite the relatively harsh environmental conditions under which the engine presently operates. Additionally, this scheduling scheme provides a maximum engine power output permitted by the EP ceiling 118 under such EP constraint conditions, which was traditionally regarded as desirable on behalf of work vehicle operators considering, in particular, that the scheduled engine power output has already been significantly reduced relative to that provided under standard operating conditions (as indicated by shaded area 124 in FIG. 3). Degradations in the overall drivability (e.g., noticeable variations in work vehicle speed and power availability occurring with variations in engine load) have been accepted as an inextricable outcome or necessary tradeoff in applying such EP engine protection measures.

Surprisingly, it has been discovered that operator satisfaction levels increase, rather than decrease, by reducing the engine power output under non-standard operating (EP constraint) conditions, particularly when the general shape of the default power bulge profile is largely or wholly preserved. For this reason, embodiments of the present disclosure govern engine power output under non-standard operating (EP constraint) conditions in accordance with a dynamically-adjusted power bulge profile, which has a shape that matches or that is at least highly similar to (e.g., assuming the form of a compressed version of) the shape of the default power bulge profile. In embodiments, a dynamically-adjusted power bulge profile may be generated utilizing the shape of the default power bulge profile and, specifically, by repeatedly fitting the shape of the default power bulge profile beneath the moving EP ceiling as the EP ceiling moves (vertically translates) in conjunction with real-time changes in operating conditions. Additionally, embodiments of the present disclosure may likewise preserve the availability of a boost function (if normally provided) via generation of a dynamically-adjusted power boost profile by fitting the shape of the power boost profile beneath the moving EP ceiling. Such a unique power scheduling approach provides several benefits, which will now be discussed in connection with FIGS. 4 and 5.

Figure 4:
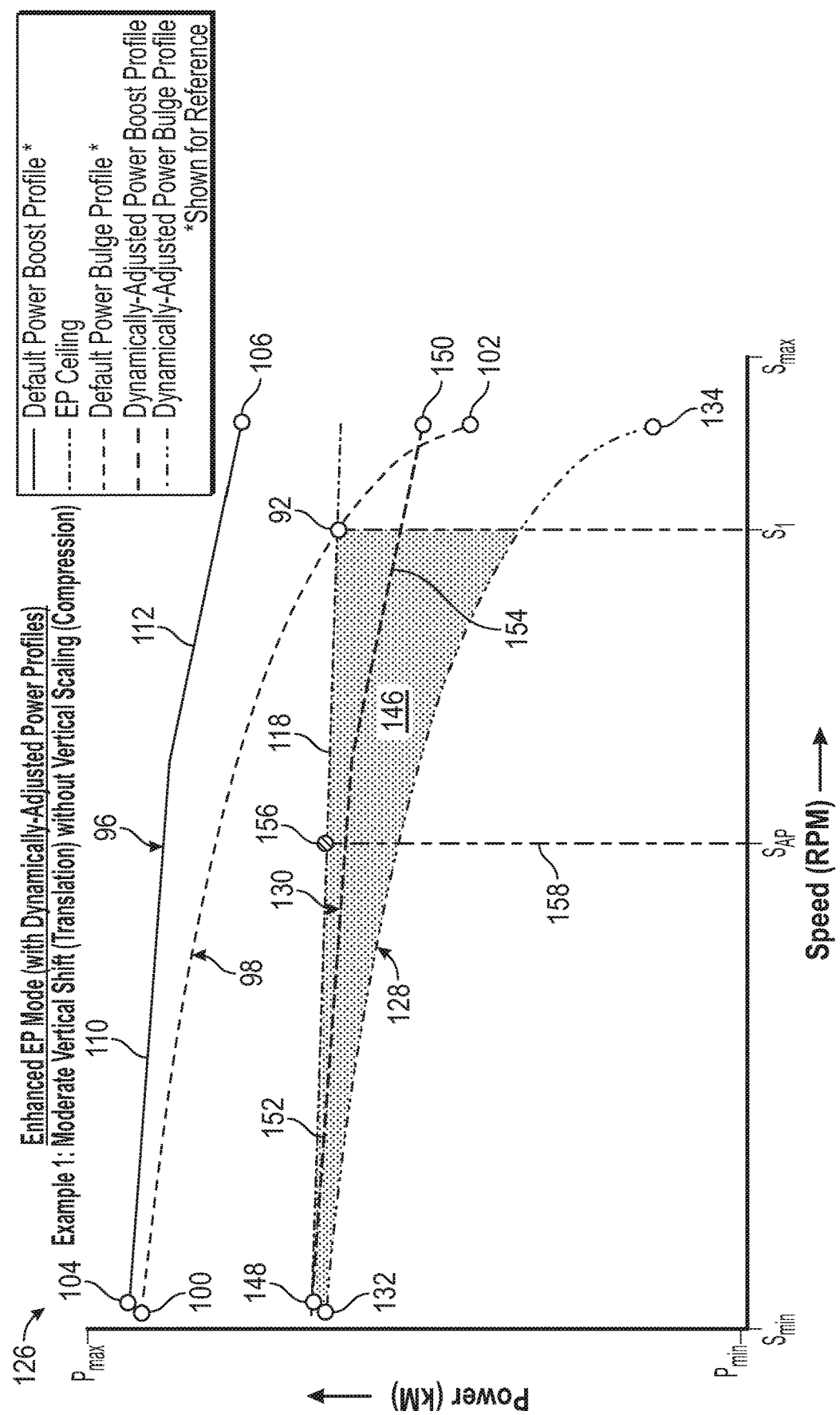
FIGS. 4 and 5 are power/speed graphs illustrating an example manner in which the work vehicle engine control system of FIG. 1 may generate dynamically-adjusted power profiles by fitting the corresponding default profile shapes beneath the EP ceiling through shift (translation) when the engine control system operates in an enhanced EP mode.

Turning to FIG. 4, a power/speed graph 126 is shown including a dynamically-adjusted power bulge profile 128, which may be generated by the controller architecture 24 when the work vehicle engine control system 22 operates in an enhanced EP mode in an example embodiment of the present disclosure. The axes and scale of the power/speed graph 126 correspond to the power/speed graphs 94, 114, with the engine power and engine speed plotted along the vertical and horizontal axes of the graph 125, respectively. The default power bulge profile 98 and the default power boost profile 96 have been transposed or carried-over to the power/speed graph 126 (along with corresponding reference numerals) for visual reference. In practice, however, the controller architecture 24 does not utilize the default power bulge profile 98 or the default power boost profile 96 in scheduling the engine power output of the work vehicle engine 34 in the enhanced EP mode, but rather utilizes the dynamically-adjusted power bulge profile 128 or, in certain cases, a dynamically-adjusted power boost profile 130 to schedule the engine power output, as described in detail below. The EP ceiling 118 is also carried-over from FIG. 3 to the power/speed graph 126 for reference. While shown as a complete profile or characteristic in FIG. 4, as well as in FIGS. 5 and 6 (further described below), the EP ceiling 118 can be expressed as a single value or point on a power/speed graph in alternative embodiments, with the single value or point denoting a maximum permissible power output above which the maximum power output values of the dynamically-adjusted power profiles 128, 130 should not rise.

It can be seen that the dynamically-adjusted power bulge profile 128 has a shape matching that of the default power bulge profile 98 is the illustrated example. However, the vertical (power-wise) position of the dynamically-adjusted power bulge profile 128 is lower than the vertical position (less than the power-wise position) of the default power bulge profile 98. As result of its lowered positioning, as expressed on the power/speed graph 126, the dynamically-adjusted power bulge profile 128 is located below or beneath the EP ceiling 118; this phrasing not precluding that one or more points at the peak or peaks of the dynamically-adjusted power bulge profile 128 may coincide with the EP ceiling 118. In the present example, the dynamically-adjusted power bulge profile 128 (or the depicted portion of the profile 128) begins at an illustrated start point 132 having the same speed value (a first speed value) as does the illustrated start point 104 of the default power bulge profile 98, while the illustrated start point 132 possesses a power output value that is (i) less than the power output value of the illustrated start point 100 of the default power bulge profile 98 and (ii) less or substantially equal to the power output value of the EP ceiling 118 at the first speed value. The peak or maximum power output value of the dynamically-adjusted power bulge profile 128 (here, corresponding to the start point 132) may be located on or immediately beneath the EP ceiling 118. As shown in FIG. 4, the dynamically-adjusted power bulge profile 128 further terminates at an illustrated end point 134 having the same speed value (a second speed value) as does the illustrated end point 106 of the default power bulge profile 98, while having a power output value that is (i) less than that of the illustrated end point 102 of the default power bulge profile 98 and (ii) less or substantially equal to the power output value of the EP ceiling 118 at the second speed value. Further, the power differential ($P_A$) between the illustrated start points 100, 132 at the first speed value is equal to the power differential ($P_A$) between the illustrated end points 102, 134. Comparatively, the power differential ($P_A$) between the illustrated start point 132 of the dynamically-adjusted power bulge profile 128 and the EP ceiling 118 at the first speed value is considerably less (e.g., by a factor of 100 or more) than the power differential ($P_A$) between the illustrated end point 134 of the dynamically-adjusted power bulge profile 128 and the EP ceiling 118 at the second speed value.

During operation of the work vehicle engine control system 22 in the enhanced EP mode, the controller architecture 24 generates the dynamically-adjusted power bulge profile 128 by repeatedly fitting the shape of the default power bulge profile 98 beneath the EP ceiling 118. In the example of FIG. 4, this is accomplished purely through vertical shifting the shape of the default power bulge profile 98 in a downward direction (that is, in the direction of decreasing power output) to yield the dynamically-adjusted power bulge profile 128. The power bulge profile 128 is thus "dynamically-adjusted" in the sense that the controller architecture 24 shifts or translates the dynamically-adjusted power bulge profile 128 on a repeated or iterative basis (e.g., responsive to real-time sensor input) to match the power-wise movement of the EP ceiling 118 as the EP ceiling 118 ascends and descends, as the case may be, along the vertical axis of the power/speed graph 126. Again, such movement of the EP ceiling 18 occurs in relation to changes in the relevant data inputs impacting the engine protection (EP constraint) scheme. As a generalized example, as the ambient temperature increases and/or as the atmospheric pressure decreases with increasing altitude, the EP ceiling 118 may vertically shift in a downward direction in the context of the power/speed graph 126. As further expressed on the power/speed graph 126, so too does the dynamically-adjusted power bulge profile 128 shift downwardly to match the movement of the EP ceiling 118, ensuring that the power bulge profile 128 remains below the moving EP ceiling 118.

In the scenario of FIG. 4, the work vehicle engine control system 22 (FIG. 1) iteratively generates or modifies the dynamically-adjusted power bulge profile 128 by shifting the shape of the default power bulge profile 98 below the EP ceiling 118 (without vertical scaling) to yield the dynamically-adjusted power bulge profile 128. The controller architecture 24 then utilizes the dynamically-adjusted power bulge profile 128 to schedule the engine power output as the work vehicle engine control system 22 continues to operate the enhanced EP mode (unless the power boost function of the work vehicle is activated, as explained below). The controller architecture 24 may utilize the dynamically-adjusted power bulge profile 128 to determine or identify a power output target ($PO_{TAR}$), and then transmit one or more actuator command signals to the actuated devices 76 (FIG. 1) to bring the engine power output into closer alignment or harmony with power output target ($PO_{TAR}$); that is, such that the engine power output (and, as a corollary, the engine torque output) is substantially equivalent to or at least trends toward the power output target ($PO_{TAR}$), noting that real world conditions may prevent the actual engine power output from precisely matching the power output target ($PO_{TAR}$). Should the EP constraint conditions later cease, the work vehicle engine control system 22 (FIG. 1) returns to governing engine power output in accordance with the default power bulge profile 98 or, if applicable, the default power boost profile 96 in the previously-described manner.

This approach of scheduling engine power output under EP constraint conditions provides several advantages over the conventional approach outlined in conjunction with FIG.

3 above. First, as a primary benefit, overall operator satisfaction levels may be improved under EP constraint conditions by implementing the enhanced EP mode described herein. Without being bound by theory, it is believed that such improvements in operator satisfaction are at least partially due to the preservation of the general shape of the default power bulge profile 98 when generating the dynamically-adjusted power bulge profile 128. On average, work vehicle operators are acutely aware of the relationship between power output and engine speed under standard operating (non-EP constraint) conditions, and the general preservation of the default profile shape in generating the dynamically-adjusted power bulge profile 128 (most notably, the preservation of the downwardly-sloped "bulge" region 103 of the profile 128) aligns more closely with firmly-established operator expectations. This may be contrasted against the shape outlined by arrows 120, 122 in FIG. 3, which, while effectively scheduling the work vehicle engine to provide a maximum permitted power output under EP constraint conditions, varies considerably relative to the geometry of the default power bulge profile 98, particularly over the segment of the path identified by arrows 120.

As a second benefit to the enhanced EP protection approach, it has been discovered that, counterintuitively, operator satisfaction and driving behaviors are negatively impacted when scheduling a maximum engine power output allowed by the EP ceiling 118 under EP constraint conditions. Referring briefly again to FIG. 3 and for the purposes of discussion, assume that the work vehicle engine 34 is presently operating at a rotational output speed of S2, which is identified by a dashed line 136 (hereafter, the "S2 speed line 136") in the power/speed graph 114 of FIG. 3. As indicated by a first marker 138 positioned at the upper terminal end of the S2 speed line 136, the engine power output is scheduled at the maximum level permitted by the EP ceiling 118 in accordance with the conventional EP protection scheme. Under such conditions, work vehicle operators become highly aware that the work vehicle engine 34 is operating at a maximum power output due to, for example, abrupt motions of the work vehicle (colloquially, "lurching" of the work vehicle) with variations in engine load. In response, the work vehicle operators tend to modify driving behaviors to relieve perceived engine stressors by reducing the actual power output of the work vehicle engine 34 to lower levels, such as the level indicated by the second marker 140 appearing along the S2 speed line 136. Consequently, despite scheduling the work vehicle engine 34 to provide a maximum permissible power output at a given engine speed (in this example, speed S2 designated by the dashed line 136), an operator may nonetheless control the work vehicle to reduce the engine power output to a lower value (corresponding to marker 140), while gaining a negative impression of the engine performance and strain. Conversely, if the power output of the work vehicle engine 34 is instead initially scheduled at the lower power output (again, generally corresponding to the marker 140 in FIG. 3, with marker 140 located on or close to the dynamically-adjusted power bulge profile 128 in FIG. 4), such negative impressions and undesired driving reactions on behalf of the operator tend to be minimized, if not altogether avoided.

Referring jointly to FIGS. 3 and 4, the stippled area or region 146 bounded by the EP ceiling 118 and the dynamically-adjusted power bulge profile 128 extending to the S1 speed line 144 (hereafter, the "power bandwidth region 146") represents the available gap or bandwidth for boosting engine power output when scheduled in accordance with the dynamically-adjusted power bulge profile 128 (as opposed to the EP ceiling 118, as traditional). Advantageously, this newly-availed power bandwidth region 146 enables the scheduled engine power to readily increase within the power bandwidth region 146 to accommodate increases in engine load; e.g., due to activation of an auxiliary function (e.g., the unloading auger 44 shown in FIG. 1), the climbing of the combine harvester 20, or other such actions. The overall drivability of the work vehicle and operator comfort may be improved as a result. Moreover, the creation of the power bandwidth region 146 also provides another notable benefit, as well, namely the ability to maintain the availability of the power boost function under EP constraint conditions. In this regard, the provision of the dynamically-adjusted power bulge profile 128 enables the generation and usage of a dynamically-adjusted power boost profile in scheduling engine power output under EP constraint conditions. An example of one such dynamically-adjusted power boost profile 130 is further plotted on the example power/speed graph 126 presented in FIG. 4. Here, the dynamically-adjusted power boost profile 130 (or at least the illustrated portion of the power boost profile 130) extends from an illustrated start point 148 to an illustrated end point 150. The dynamically-adjusted power boost profile 130 is generated by fitting the shape of the default power boost profile 196 beneath the EP ceiling 118 in a manner analogous to that described above in conjunction with the dynamically-adjusted power bulge profile 128. Again, the peak or maximum power output of the dynamically-adjusted power boost profile 130 (here, corresponding to the below-described start point 148) may be located on or immediately below the EP ceiling 118. The controller architecture 24 further generates the dynamically-adjusted power boost profile 130 to fit or extend between the EP ceiling 118 and the dynamically-adjusted power bulge profile 128, as taken along the horizontal (speed-wise) axis of the power/speed graph 126.

With continued reference to FIG. 4, the shape of the default power boost profile 196 is translated or shifted vertically downward (as expressed on the power/speed graph 126) to fit beneath the EP ceiling 118 and yield the dynamically-adjusted power bulge profile 128. The controller architecture 24 further modifies, on a repeated or "on-the-fly" basis, the positioning of the dynamically-adjusted power bulge profile 128 as the EP ceiling 118 moves vertically along the engine power output axis of the power/speed graph 126 in relation to changes in the sensor inputs impacting the EP constraint conditions. As the shape of the dynamically-adjusted power boost profile 130 matches that of the default power boost profile 96 in this illustrated example, the dynamically-adjusted power boost profile 130 also assumes the form of a relatively simple piecewise function including a first linear segment 152 having a first negative slope (corresponding to the segment 110 of the default power boost profile 130) and a second linear segment 154 having a second negative slope less (steeper) than the first negative slope (the second linear segment 154 corresponding to the segment 112 of the default power boost profile 130).

The controller architecture 24 can determine when to apply the dynamically-adjusted power bulge profile 128 under EP constraint conditions in essentially the same manner as when the controller architecture 24 applies the default power boost profile 96 under standard operating (non-EP constraint) conditions. Depending upon the control scheme employed, an operator may still be permitted to manually activate the power boost function of the work vehicle (e.g., the combine harvester 20 shown in FIG. 1) under EP constraint conditions; e.g., utilizing a manual input (e.g., a button or switch) or by interacting with a graphical user interface (GUI) generated on a display device within the cabin 28 of the combine harvester 20. In other instances, the power boost function may be automatically activated by the controller architecture 24 (that is, activated without requiring operator input) in response to occurrence of a predefined trigger event, such as an anticipated or measured increase in engine load. In the case of the example combine harvester 20, the controller architecture 24 may automatically switch to scheduling the engine power output in accordance with the dynamically-adjusted power boost profile 130 in response to activation of a particular load-intensive function of the combine harvester 20 (e.g., the unloading auger 44) under EP constraint conditions. The preservation of such a power boost function further improves consistency in work vehicle operation under EP constraint conditions to provide additional improvements in operator experience.

In the above-described embodiment, the controller architecture 24 repeatedly or iteratively adjusts the vertical (power-wise) position of the EP ceiling 118, and therefore the dynamically-adjusted power bulge profile 128 and the dynamically-adjusted power boost profile 130 (if utilized), in response to sensed changes in parameters affecting the EP constraint conditions. As the shape of the EP ceiling 118 remains consistent, the controller architecture 24 needs only recall the definition of the EP ceiling 118 from the memory 88 and then determine the appropriate power output value for a particular engine speed (hereafter, the "fixed reference speed") to properly position the EP ceiling 118 in the context of the power/speed graph 126. An example of such a fixed reference speed is identified in FIG. 4 by a speed line 158. A marker 156 identifies the intersection between the speed line 158 and the EP ceiling 118, with the designated point hereafter referred to as the "EP ceiling positioning reference point 156." In the illustrated embodiment in which the EP ceiling 118 assumes the form of a linear (straight line) function having a constant slope, the controller architecture may recall the fixed reference speed from memory, along with the slope of the EP ceiling 118. The controller architecture 24 may then located the EP ceiling 118 on the power/speed graph 126 utilizing the current power output value of the EP ceiling 118 at the fixed reference speed. For example, in embodiments in the controller architecture 24 includes a first controller (e.g., an ECU) and a second controller (e.g., a controller dedicated to or associated with the operator station of a work vehicle, such as the operator station enclosed by the cabin 28 of the combine harvester 20), the first controller (e.g., the ECU) may calculate the location of the EP ceiling positioning reference point 156 and provide the appropriate location data to the second controller; e.g., via publishing or rendering visible this information on a vehicle bus. In this case, the first controller (e.g., the ECU) need only publish a single value via the bus (the current power output value of the EP ceiling positioning reference point 156) as the speed value of the EP ceiling positioning reference point 156 and the shape definition of the EP ceiling 118 is already known to the second controller; that is, stored in an area of the memory 88 accessible to the second controller.

In further embodiments, the EP ceiling 118 may be positioned on the power/speed graph 126 utilizing a different approach. For example, and noting that the speed-wise location of the maximum or peak power output value of the dynamically-adjusted power bulge profile 128 is known to the controller architecture 24 from the default power bulge profile 98 (in the instant example, the speed value corresponding to start point 132 of the power bulge profile 128), the EP ceiling 118 may be expressed as a single value indicating the maximum permissible power output value for the maximum or peak power output of the dynamically-adjusted power bulge profile 128. The controller architecture 24 may then adjust the shape of the default power bulge profile 98 such that the start point 132 of the dynamically-adjusted power bulge profile 128 is coincident with the EP ceiling 118 at this point or has a power output value slightly less than the EP ceiling 118 at this point. Similarly, and again noting that the speed-wise location of the maximum or peak power output value of the dynamically-adjusted power boost profile 130 is known to the controller architecture 24 from the default power boost profile 96 (in the instant example, the speed value corresponding to start point 148 of the power boost profile 130), the EP ceiling 118 may be expressed as a single value indicating the maximum permissible value for the peak power output of the dynamically-adjusted power boost profile 130. When appropriate, the controller architecture 24 may then adjust the shape of the default power bulge profile 98 such that the start point 148 of the dynamically-adjusted power boost profile 130 is coincident with the EP ceiling 118 at this point or has a power output value slightly less than the EP ceiling 118 at this point.

There has thus been described implementations of a work vehicle engine control system, particularly the engine control system 22 (FIG. 1), operable in an enhanced EP mode in which one or more dynamically-adjusted power profiles are utilized to schedule engine power output under EP constraint conditions. In the above-described example, the controller architecture of the work vehicle (namely, the controller architecture 24 of the combine harvester 20) generates a dynamically-adjusted power bulge profile (the power bulge profile 128 shown in FIG. 4) and at least one dynamically-adjusted power boost profile (the power boost profile 130 further shown in FIG. 4), while iteratively adjusting such profiles in response to EP ceiling movement. Further, the dynamically-adjusted power profiles 128, 130 are modified solely through displacement and, specifically, through vertical (power-wise) shift or translation in the above-described example. This may be more fully appreciated by reference to FIG. 5, which illustrates the dynamically-adjusted power profiles 128, 130 after further downward shift of the profiles 128, 130 (relative to the example of FIG. 4) in a manner matching or mirroring a downward shift or descent of the EP ceiling 118. In this drawing figure, an arrow 160 denotes the downward movement (that is, movement in the direction of decreasing power output) of the EP ceiling positioning reference point 156 relative to the position of the positioning reference point 156 shown in FIG. 4. In further implementations, the dynamically-adjusted power profiles 128, 130 may be fit beneath the EP ceiling 118 utilizing a vertical scaling (compression) technique in addition to (or perhaps in lieu of) vertical shifting. For example, in various embodiments, the controller architecture 24 may both vertically shift and vertically scale the dynamically-adjusted power profiles 128, 130 under EP constraint conditions, with such vertical scaling potentially applied consistently with vertical shifting or, perhaps, only applied after a predetermined threshold of vertical shifting has been surpassed.

Figure 5:
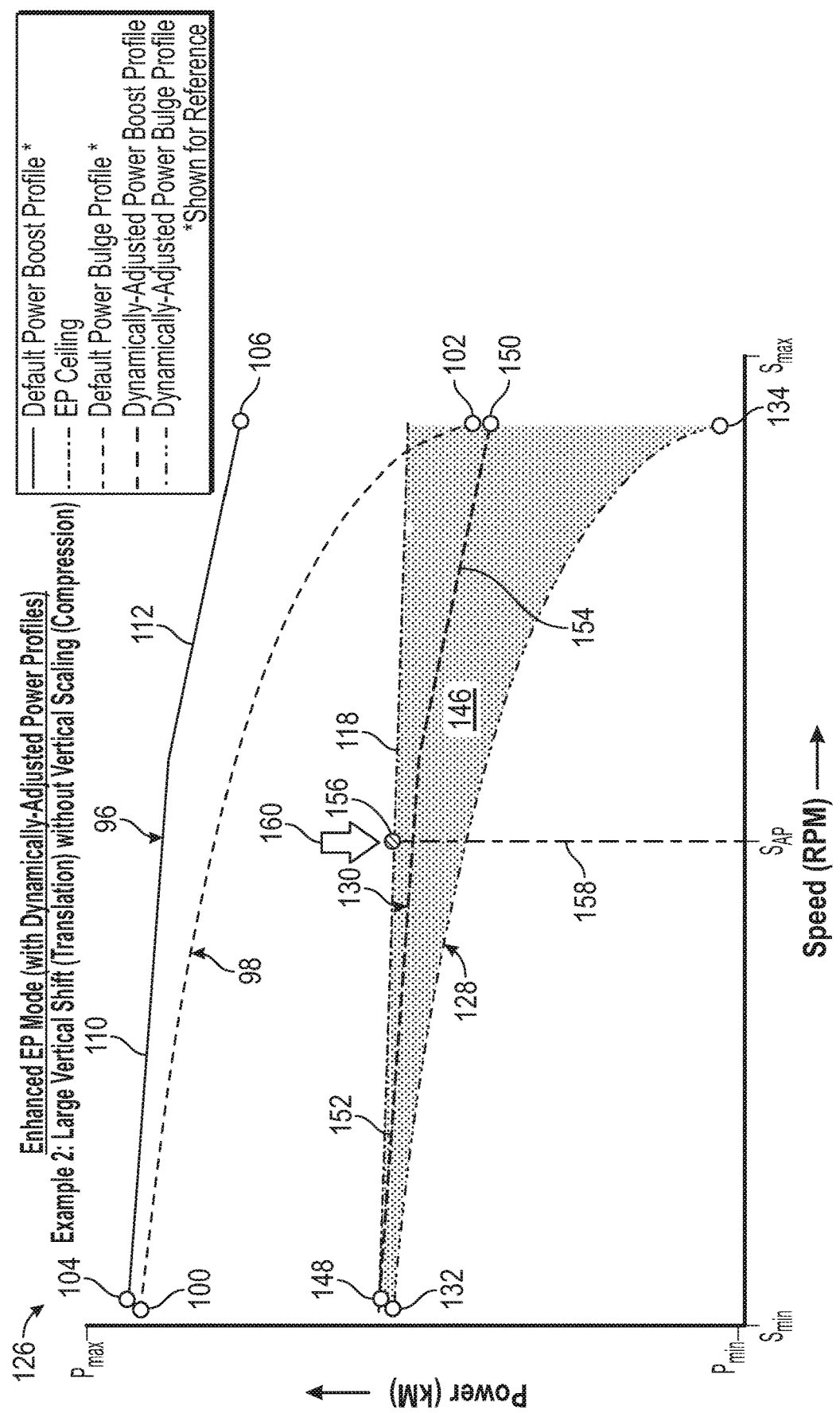
Figure 6:
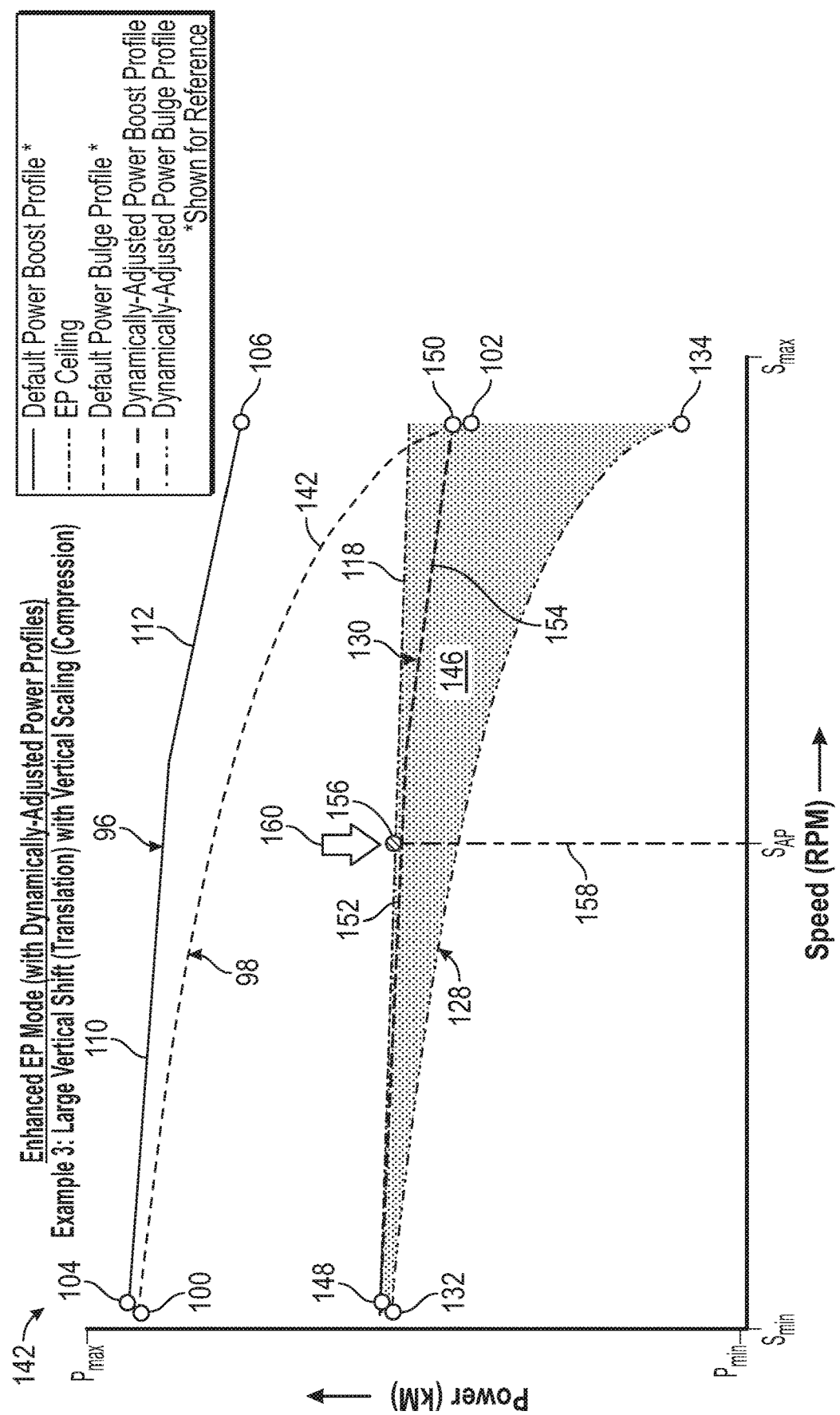
FIG. 6 is a power/speed graph illustrating an example manner in which the work vehicle engine control system of FIG. 1 may generate dynamically-adjusted power profiles by fitting corresponding default profile shapes beneath the EP ceiling through a combination of shift (translation) and scaling (compression) when the engine control system operates in an enhanced EP mode.

Turning to FIG. 6, a power/speed graph 142 sets-forth example of one manner in which the controller architecture 24 may fit the dynamically-adjusted power bulge profile 128 and the dynamically-adjusted power boost profile 130 (if generated) beneath the EP ceiling 118 utilizing a technique combining vertical shift (translation) and vertical scaling (compression). On the power/speed graph 142 (FIG. 6), the vertical (power-wise) position of the EP ceiling 118 is identical to that shown in power/speed graph 126 (FIG. 5). However, as may be appreciated by comparing these drawing figures, both the dynamically-adjusted power bulge profile 128 and the dynamically-adjusted power boost profile 130 have been reduced in vertical scale (compressed) in addition to being shifted vertically downward in the example of FIG. 6 in conjunction with the downward shifting of the EP ceiling 118. Here, vertical shift and scaling are applied concurrently such that the illustrated start point 132 of the dynamically-adjusted power bulge profile 128 in the example of FIG. 6 is coincident with the illustrated start point 132 of the power bulge profile 128 in the example of FIG. 5 (which remains at or immediately below the EP ceiling 118), while the illustrated end point 134 of the dynamically-adjusted power bulge profile 128 in the example of FIG. 6 has a higher output value than does the illustrated start point 132 of the power bulge profile 128 in the example of FIG. 5. As a corollary, the power differential ($P_A$) between the start and end points 132, 134 (or, more generally, the maximum and minimum power output values, respectively) of the dynamically-adjusted power bulge profile 128 in the example of FIG. 6 is less than the power differential between the ($P_A$) the start and end points 132, 134 of the power bulge profile 128 in the example of FIG. 5. Further, due to profile flattening occurring as a result of such vertical scaling or compression, the average slope of the dynamically-adjusted power bulge profile 128 in the example of FIG. 6 is less than (closer to zero than) the average slope of the dynamically-adjusted power bulge profile 128 in the example of FIG. 6.

The statements above pertain equally to the dynamically-adjusted power boost profile 130, which is both vertically shifted (translated) and vertically scaled (compressed) in the example of FIG. 6. Accordingly, the dynamically-adjusted power boost profile 130 is generated to have a profile shape that is, in essence, a displaced and compressed version of the profile shape of the default power bulge profile 98. Further, the illustrated end point 150 of the dynamically-adjusted power boost profile 130 in the example of FIG. 6 has a higher power output value (and is located above the illustrated end point 102 of the default power bulge profile 98) than does the illustrated end point 150 of the power boost profile 130 in the example of FIG. 5. Additionally, the average slope (and the power range) of the dynamically-adjusted power boost profile 130 in the example of FIG. 6 is less than the average slope (and the power range) of the dynamically-adjusted power boost profile 130 in the example of FIG. 5.

Figure 7:
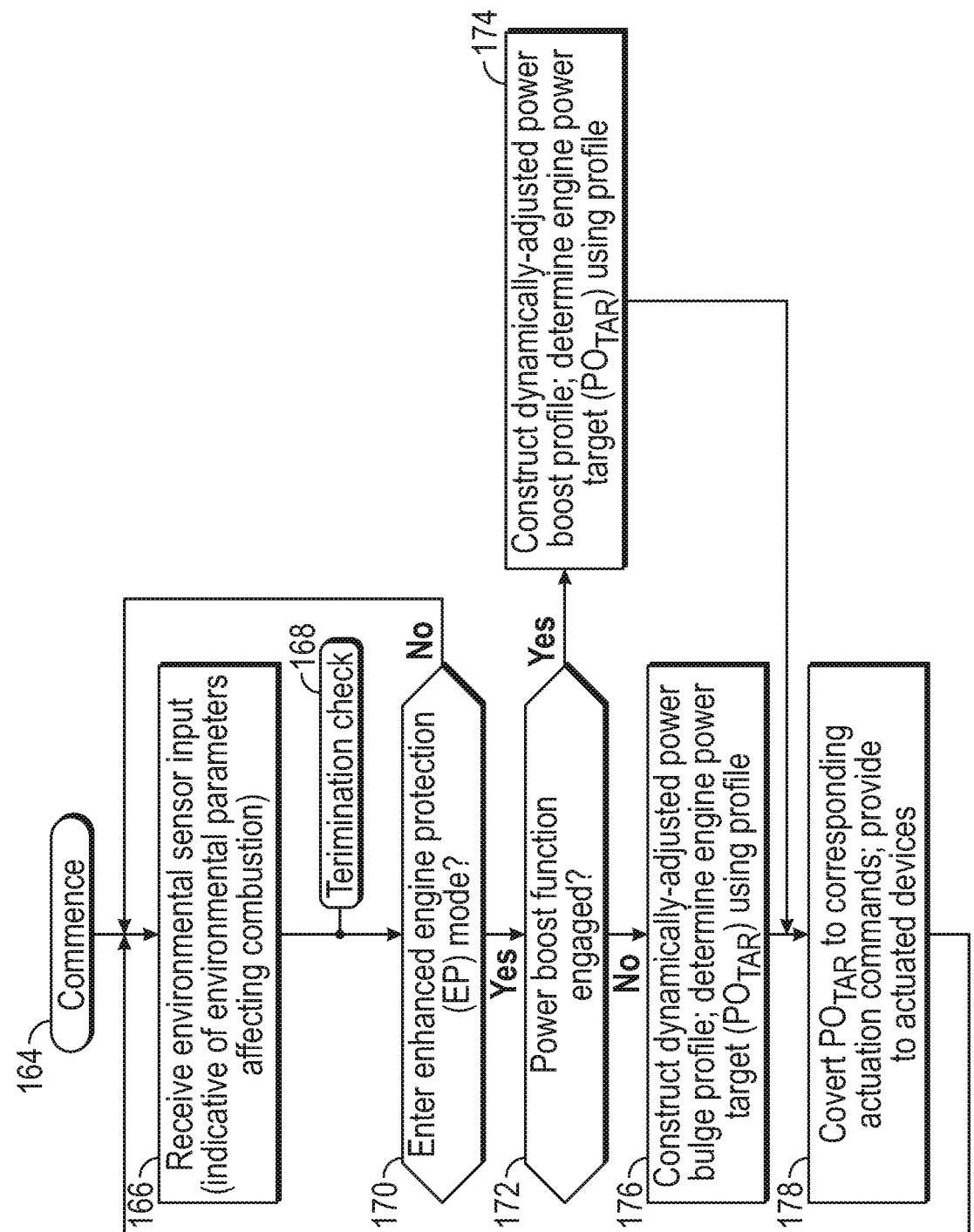
FIG. 7 is a flowchart illustrating an EP enhancement process suitably carried-out by the controller architecture of the work vehicle engine control system (FIG. 1) when operating in an enhanced EP mode in an example embodiment of the present disclosure.

Advancing lastly to FIG. 7, a flowchart setting-forth an example process 162 that may be carried-out by the controller architecture 24 under potential EP constraint conditions. The process 162 (hereafter the "EP enhancement process 162") includes a number of process STEPS 164, 166, 168, 170, 172, 174, 176, 178 each of which is described, in turn, below. Depending upon the particular manner in which the EP enhancement process 162 is implemented, each step generically illustrated in FIG. 7 may entail a single process or multiple sub-processes. Further, the steps illustrated in FIG. 7 and described below are provided by way of non-limiting example only. In alternative embodiments of the EP enhancement process 162, additional process steps may be performed, certain steps may be omitted, and/or the illustrated process steps may be performed in alternative sequences.

The EP enhancement process 162 commences at STEP 164 in response to the occurrence of a predetermined trigger event, such as the startup of the work vehicle or in response to entry of operator input activating the EP enhancement process 162. After commencing the process 162, the controller architecture 24 progresses to STEP 166 and collects the data parameters utilized to determine whether operation under EP constraint conditions is warranted. For example, and as previously indicated, the controller architecture 24 may collect data inputs indicative of the atmospheric pressure and ambient temperature of the environment in which the work vehicle (here, the combine harvester 20) operates. The controller architecture 24 may then utilize such parameters to determine the appropriate vertical (power-wise) position of the EP ceiling 118, as expressed on a power/speed graph similar or identical to the above-described graphs 126, 142. Utilizing this information, the controller architecture 24 then determines, at STEP 170, whether to place the work vehicle engine control system 22 in the enhanced EP mode. In particular, and as previously noted, the controller architecture 24 may determine to entry into or placement in the enhanced EP mode is warranted should the EP ceiling 118 contact (or come within a predetermined, relatively close proximity of) the default power bulge profile 98 (FIGS. 4-6). If determining that the work vehicle engine control system 22 should enter the enhanced EP mode (or continue operation in the enhanced EP mode), the controller architecture 24 advances to STEP 172 and transitions to operation in the standard operation (non-EP constraint) mode to operation in the enhanced EP mode, as described below. Otherwise, if determining that the work vehicle engine control system 22 is not properly placed in the enhanced EP mode (or should revert from the enhanced EP mode, if presently active, to the standard operation mode), the controller architecture 24 returns to STEP 166 and continues to monitor the relevant data inputs. Additionally, as indicated in FIG. 7 at intervening STEP 168, a termination check may be performed as some juncture in this process flow to determine whether the current iteration of the EP enhancement process 162 should terminate.

When advancing to STEP 172 of the EP enhancement process 162, the controller architecture 24 effectively enters the enhanced EP mode and determines whether the EP power boost function (if provided) is desirably activated at the present juncture in time. The EP power boost function may be activated by operator input in certain embodiments; and, in other instances, activated automatically by the controller architecture 24 in response to a predefined trigger event, such as activation of an auxiliary work vehicle function placing a relatively large secondary or "parasitic" load on the work vehicle engine. As mentioned previously, an example of such an auxiliary work vehicle function in the context of the combine harvester 20 (FIG. 1) is activation of the unloading auger 44. As a second example, in the cast of a tractor having a PTO shaft, the trigger event may indicate that the tractor engine is presently driving a relatively demanding load (e.g., a baler or similar implement towed by the tractor) via the PTO shaft. If the dynamic EP power boost function is desirably activated, the controller architecture 24 advances to STEP 174, constructs or generates the dynamically-adjusted power boost profile 130 utilizing a process similar or identical to that previously described (by fitting the shape of the default power boost profile 96 below the EP ceiling 118), and then utilizes the newly-generated dynamically-adjusted power boost profile 130 to determine the appropriate power output target ($PO_{TAR}$) as a function of the current engine speed. Conversely, if instead determining that the dynamic EP power boost function is not desirably activated at STEP 172, the controller architecture 24 progresses to STEP 176 and performs similar actions with respect to the dynamically-adjusted power bulge profile. In this latter regard, at STEP 176, the controller architecture 24 constructs the dynamically-adjusted power boost profile 130 utilizing a process similar or identical to that previously described (by fitting the shape of the default power bulge profile 98 below the EP ceiling 118), and then utilizes the dynamically-adjusted power bulge profile 128 to determine the appropriate power output target ($PO_{TAR}$) as a function of the current engine speed.

After performing either STEP 174 or STEP 176 of the EP enhancement process 162, the controller architecture 24 progresses to STEP 178 and schedules the engine power output in accordance with the newly-determined power output target ($PO_{TAR}$). Generally, this may be accomplished by converting the power output target ($PO_{TAR}$) to corresponding actuation adjustment commands and then providing such commands to the appropriate actuation devices, such as one or more of the actuated devices 76 described above in connection with the example combine harvester 20 (FIG. 1). Such commands may cause various actuators to adjust the rate of metered fuel flow to the combustion chambers of the work vehicle engine 34 and/or may affect the air pressure or temperature within the engine combustion chambers (through modulation of one or more valves 58, 66 included in the EGR system 46), as previously discussed. Following this, the controller architecture 24 returns to STEP 166 of the EP enhancement process 162 and the above-described process steps repeat. In this manner, the controller architecture 24 may execute the EP enhancement process 162 to identify appropriate junctures in which to place the work vehicle engine control system 22 into the enhanced EP mode; and, when so doing, to schedule engine power output in accordance with a selected one of the dynamically-adjusted power profiles.

Enumerated Examples of the Work Vehicle Engine Control System

The following examples of the work vehicle engine control system are further provided and numbered for ease of reference.

1. In embodiments, the work vehicle engine control system includes a memory storing a first default power profile having a first profile shape as expressed on a power/speed graph, which includes a vertical axis along which power output of the work vehicle engine increases in an upward direction and which includes a horizontal axis along which engine speed increases in a rightward direction. A controller architecture is coupled to the memory and is operable in the enhanced EP mode in which the controller architecture: (i) generates a first dynamically-adjusted power profile by repeatedly fitting the first profile shape beneath a moving EP ceiling as expressed on the power/speed graph; (ii) utilizes the first dynamically-adjusted power profile to determine a power output target ($PO_{TAR}$) corresponding to a current speed of the work vehicle engine; and (iii) schedules the power output of the work vehicle engine in accordance with the power output target ($PO_{TAR}$).

2. The work vehicle engine control system of example 1, wherein the work vehicle includes at least a first environmental sensor providing data indicative of an environmental parameter affecting combustion within the work vehicle engine. The controller architecture is further configured to repeatedly establish a current vertical position of the moving EP ceiling as expressed on the power/speed graph utilizing data provided by the first environmental sensor.

3. The work vehicle engine control system of example 1, wherein the work vehicle includes at least a first engine actuation devices controllable to vary a metered quantity of fuel or a quantity of oxygen supplied to the work vehicle engine per combustion cycle. The controller architecture is configured to transmit an actuation command to the first engine actuation device when scheduling the power output of the work vehicle engine in accordance with the power output target ($PO_{TAR}$).

4. The work vehicle engine control system of example 1, wherein the first default power profile and the dynamically-adjusted power bulge profile comprise a default power bulge profile and a dynamically-adjusted power bulge profile, respectively. The controller architecture is configured to utilize the dynamically-adjusted power bulge profile to determine the power output target ($PO_{TAR}$) in at least selected instances.

5. The work vehicle engine control system of example 4, wherein the controller architecture normally operates in a non-enhanced EP mode and is configured to transition from the non-enhanced EP mode to the enhanced EP mode when the moving EP ceiling descends into a predetermined proximity of the default power bulge profile as expressed on the power/speed graph.

6. The work vehicle engine control system of example 5, wherein the controller architecture is configured to transition from the non-enhanced EP mode to the enhanced EP mode when the default power bulge profile is intersected by the moving EP ceiling shifts in its current vertical position as expressed on the power/speed graph.

7. The work vehicle engine control system of example 4, wherein the default power bulge profile has a curved shaped having a slope that becomes increasingly negative with increasing engine speed.

8. The work vehicle engine control system of example 4, wherein the work vehicle has a power boost function, while the memory further stores a default power boost profile having a second profile shape. The controller architecture is further configured to utilize the dynamically-adjusted power bulge profile to determine the power output target ($PO_{TAR}$) when the power boost function is disengaged. When the power boost function is engaged, the controller architecture is configured to (i) generate a dynamically-adjusted power boost profile by fitting the second profile shape beneath the moving EP ceiling in its current vertical position as expressed on the power/speed graph, and (ii) utilize the second dynamically-adjusted power profile to determine the power output target ($PO_{TAR}$) for scheduling the power output of the work vehicle engine.

9. The work vehicle engine control system of example 8, wherein the work vehicle assumes the form of a combine harvester having an unloading auger. The controller architecture is configured to automatically engage the power boost function when the unloading auger is active.

10. The work vehicle engine control system of example 8, wherein the controller architecture generates the dynamically-adjusted power boost profile to extend between the EP ceiling and the dynamically-adjusted power bulge profile, as taken along the vertical axis of the power/speed graph.

11. The work vehicle engine control system of example 1, wherein the controller architecture is configured to generate the first dynamically-adjusted power profile utilizing a technique including shifting the first profile shape to fit beneath the moving EP ceiling as expressed on the power/speed graph.

12. The work vehicle engine control system of example 1, wherein the controller architecture is configured to generate the first dynamically-adjusted power profile utilizing a technique including scaling the first profile shape to fit beneath the moving EP ceiling as expressed on the power/speed graph.

13. The work vehicle engine control system of example 1, wherein the controller architecture is configured to generate the first dynamically-adjusted power profile utilizing a technique including shifting and scaling the first profile shape to fit beneath the moving EP ceiling as expressed on the power/speed graph.

14. In further embodiments, the work vehicle engine control system includes a memory and controller architecture, which is coupled to the memory and which is operable in an enhanced EP mode. The memory stores a default power bulge profile having a first profile shape as expressed on a power/speed graph, which includes a horizontal axis along which engine speed increases in a rightward direction and includes a vertical axis along which power output increases in an upward direction. The memory further stores a default power boost profile having a second profile shape as expressed on the power/speed graph. When placed in the enhanced EP mode and a power boost function of the work vehicle is disengaged, the controller architecture (i) generates a dynamically-adjusted power bulge profile by repeatedly fitting the first profile shape beneath a moving EP ceiling as expressed on the power/speed graph, and (ii) utilizes the dynamically-adjusted power bulge profile to determine a power output target ($PO_{TAR}$) corresponding to a current speed of the work vehicle engine. Conversely, when placed in the enhanced EP mode and a power boost function of the work vehicle is disengaged, the controller architecture (i) generates a dynamically-adjusted power boost profile by repeatedly fitting the second profile shape beneath the moving EP ceiling, and (ii) utilizes the dynamically-adjusted power boost profile to determine the power output target ($PO_{TAR}$) corresponding to the current speed of the work vehicle engine. Whether the power boost function is engaged or disengaged, the controller architecture then schedules the power output of the work vehicle engine in accordance with the power output target ($PO_{TAR}$).

15. The work vehicle engine control system of example 14, wherein the work vehicle includes a combine harvester having an unloading auger. The controller architecture is configured to automatically engage the power boost function when the unloading auger is active.

CONCLUSION

The foregoing has thus provided embodiments of a work vehicle engine control system operable in enhanced EP modes. In embodiments, the work vehicle engine control system utilizing at least one dynamically-adjusted power profile in scheduling the power output of a work vehicle engine under EP constraint conditions. The dynamically-adjusted power profile(s) are generated to have shapes matching or nearly matching (comprising compressed versions of) corresponding profile shapes of one or more non-dynamic (static) default power profiles, which are otherwise utilized for engine scheduling under normal operating (non-EP constraint) conditions. Through the usage of such dynamically-adjusted power profile(s), which are repeatedly adjusted or modified in accordance with EP ceiling movement, the engine control system enhance the overall drivability of the work vehicle and consistency in engine behavior to improve operator satisfaction levels. Additionally, in embodiments in which the engine control system generates both dynamically-adjusted power bulge and power boost profiles when operating in the enhanced EP mode, the work vehicle engine control system preserves the availability of the work vehicle's power boost function under EP constraint conditions to bring about still further improvements in operator satisfaction levels and work vehicle efficacy.

As will be appreciated by one skilled in the art, aspects of the disclosed subject matter can be described in terms of methods, engine control systems, and computer program products. With respect to computer program products, in particular, embodiments of the disclosure may consist of or include tangible, non-transitory storage media storing computer-readable instructions or code for performing one or more of the functions described throughout this document. As will be readily apparent, such computer-readable storage media can be realized utilizing any currently-known or later-developed memory type, including various types of random access memory (RAM) and read-only memory (ROM). Further, embodiments of the present disclosure are open or "agnostic" to the particular memory technology employed, noting that magnetic storage solutions (hard disk drive), solid state storage solutions (flash memory), optimal storage solutions, and other storage solutions can all potentially contain computer-readable instructions for carrying-out the functions described herein. Similarly, the systems or devices described herein may also contain memory storing computer-readable instructions (e.g., as any combination of firmware or other software executing on an operating system) that, when executed by a processor or processing system, instruct the system or device to perform one or more functions described herein. When locally executed, such computer-readable instructions or code may be copied or distributed to the memory of a given computing system or device in various different manners, such as by transmission over a communications network including the Internet. Generally, then, embodiments of the present disclosure should not be limited to any particular set of hardware or memory structure, or to the particular manner in which computer-readable instructions are stored, unless otherwise expressly specified herein.

Finally, as used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle engine control system for scheduling a power output of a work vehicle engine onboard a work vehicle, the work vehicle engine control system comprising:

a memory storing a first default power profile having a first profile shape as expressed on a power/speed graph, the power/speed graph including a vertical axis along which power output of the work vehicle engine increases in an upward direction and a horizontal axis along which engine speed increases in a rightward direction; and a controller architecture coupled to memory and operable in an enhanced engine protection (EP) mode in which the controller architecture:

generates a first dynamically-adjusted power profile by repeatedly fitting the first profile shape beneath a moving EP ceiling as expressed on the power/speed graph;

utilizes the first dynamically-adjusted power profile to determine a power output target ($PO_{TAR}$) corresponding to a current speed of the work vehicle engine; and schedules the power output of the work vehicle engine in accordance with the power output target ($PO_{TAR}$).

2. The work vehicle engine control system of claim 1, wherein the work vehicle comprises at least a first environmental sensor providing data indicative of an environmental parameter affecting combustion within the work vehicle engine; and wherein the controller architecture is further configured to repeatedly establish a current vertical position of the moving EP ceiling as expressed on the power/speed graph utilizing data provided by the first environmental sensor.

3. The work vehicle engine control system of claim 1, wherein the work vehicle comprises at least a first engine actuation device controllable to vary a metered quantity of fuel or a quantity of oxygen supplied to the work vehicle engine per combustion cycle; and wherein the controller architecture is configured to transmit an actuation command to the first engine actuation device when scheduling the power output of the work vehicle engine in accordance with the power output target ($PO_{TAR}$).

4. The work vehicle engine control system of claim 1, wherein the first default power profile and the first dynamically-adjusted power profile comprise a default power bulge profile and a dynamically-adjusted power bulge profile, respectively; and wherein the controller architecture is configured to utilize the dynamically-adjusted power bulge profile to determine the power output target ($PO_{TAR}$) in at least selected instances.

5. The work vehicle engine control system of claim 4, wherein the controller architecture normally operates in a non-enhanced EP mode and is configured to transition from the non-enhanced EP mode to the enhanced EP mode when the moving EP ceiling descends into a predetermined proximity of the default power bulge profile as expressed on the power/speed graph.

6. The work vehicle engine control system of claim 5, wherein the controller architecture is configured to transition from the non-enhanced EP mode to the enhanced EP mode when the default power bulge profile is intersected by the moving EP ceiling due to shifts in its current vertical position as expressed on the power/speed graph.

7. The work vehicle engine control system of claim 4, wherein the default power bulge profile has a curved shape with a slope that becomes increasingly negative with increasing engine speed.

8. The work vehicle engine control system of claim 4, wherein the work vehicle has a power boost function;

wherein the memory further stores a default power boost profile having a second profile shape; and wherein the controller architecture is further configured to:

when the power boost function is disengaged, utilize the dynamically-adjusted power bulge profile to determine the power output target ($PO_{TAR}$); and when the power boost function is engaged, (i) generate a dynamically-adjusted power boost profile by fitting the second profile shape beneath the moving EP ceiling in its current vertical position as expressed on the power/speed graph, and (ii) utilize the second dynamically-adjusted power profile to determine the power output target ($PO_{TAR}$) for scheduling the power output of the work vehicle engine.

9. The work vehicle engine control system of claim 8, wherein the work vehicle comprises a combine harvester having an unloading auger; and wherein the controller architecture is configured to automatically engage the power boost function when the unloading auger is active.

10. The work vehicle engine control system of claim 8, wherein the controller architecture generates the dynamically-adjusted power boost profile to extend between the EP ceiling and the dynamically-adjusted power bulge profile as taken along the vertical axis of the power/speed graph.

11. The work vehicle engine control system of claim 1, wherein the controller architecture is configured to generate the first dynamically-adjusted power profile utilizing a technique comprising shifting the first profile shape to fit beneath the moving EP ceiling as expressed on the power/speed graph.

12. The work vehicle engine control system of claim 1, wherein the controller architecture is configured to generate the first dynamically-adjusted power profile utilizing a technique comprising scaling the first profile shape to fit beneath the moving EP ceiling as expressed on the power/speed graph.

13. The work vehicle engine control system of claim 1, wherein the controller architecture is configured to generate the first dynamically-adjusted power profile utilizing a technique comprising shifting and scaling the first profile shape to fit beneath the moving EP ceiling as expressed on the power/speed graph.

14. A work vehicle engine control system for scheduling a power output of a work vehicle engine onboard a work vehicle having a power boost function, the work vehicle engine control system comprising:

a memory storing:

a default power bulge profile having a first profile shape as expressed on a power/speed graph, the power/speed graph including a vertical axis along which power output of the work vehicle engine increases in an upward direction and a horizontal axis along which engine speed increases in a rightward direction; and a default power boost profile having a second profile shape as expressed on the power/speed graph;

a controller architecture coupled to the memory and operable in an enhanced engine protection (EP) mode in which the controller architecture:

if the power boost function is disengaged, (i) generates a dynamically-adjusted power bulge profile by repeatedly fitting the first profile shape beneath a moving EP ceiling as expressed on the power/speed graph, and (ii) utilizes the dynamically-adjusted power bulge profile to determine a power output target ($PO_{TAR}$) corresponding to a current speed of the work vehicle engine;

if the power boost function is engaged, (i) generates a dynamically-adjusted power boost profile by repeatedly fitting the second profile shape beneath the moving EP ceiling, and (ii) utilizes the dynamically-adjusted power boost profile to determine the power output target ($PO_{TAR}$) corresponding to the current speed of the work vehicle engine; and schedules the power output of the work vehicle engine in accordance with the power output target ($PO_{TAR}$).

15. The work vehicle engine control system of claim 14, wherein the work vehicle comprises a combine harvester having an unloading auger; and wherein the controller architecture is configured to automatically engage the power boost function when the unloading auger is active.

16. The work vehicle engine control system of claim 14, wherein the controller architecture is configured to:

if the power boost function is disengaged, generate dynamically-adjusted power bulge profile utilizing a technique comprising shifting the first profile shape to fit beneath the moving EP ceiling as expressed on the power/speed graph; and if the power boost function is engaged, generate dynamically-adjusted power boost profile utilizing a technique comprising shifting the second profile shape to fit beneath the moving EP ceiling as expressed on the power/speed graph.

17. The work vehicle engine control system of claim 14, wherein the controller architecture is configured to:

if the power boost function is disengaged, generate dynamically-adjusted power bulge profile utilizing a technique comprising shifting and scaling the first profile shape to fit beneath the moving EP ceiling as expressed on the power/speed graph; and if the power boost function is engaged, generate dynamically-adjusted power boost profile utilizing a technique comprising shifting and scaling the second profile shape to fit beneath the moving EP ceiling as expressed on the power/speed graph.

18. A work vehicle program product utilized in conjunction with a work vehicle engine control system including a controller architecture operable in an enhanced engine protection (EP) mode and located onboard a work vehicle having a work vehicle engine, the work vehicle program product comprising:

a non-transitory computer-readable medium;

a first default power profile stored in the non-transitory computer-readable medium and having a first profile shape as expressed on a power/speed graph, the power/speed graph including a horizontal axis along which engine speed increases in a rightward direction and including a vertical axis along which power output increases in an upward direction; and computer-readable instructions stored on the computer-readable media that, when executed by the controller architecture while the work vehicle engine control system is placed in the enhanced EP mode, causes the controller architecture to:

generate a first dynamically-adjusted power profile by fitting the first profile shape beneath an EP ceiling intersecting the first default power profile as expressed on the power/speed graph, the first dynamically-adjusted power profile having a curved shape decreasing in slope with increasing engine speed;

utilize the first dynamically-adjusted power profile to determine a power output target ($PO_{TAR}$) corresponding to a current speed of the work vehicle engine; and schedule the power output of the work vehicle engine in accordance with the power output target ($PO_{TAR}$).

19. The work vehicle program product of claim 18, wherein the computer-readable instructions, when executed by the controller architecture, further cause the controller architecture to:

repeatedly move the EP ceiling along the vertical axis of the power/speed graph in response to variations in one or more environmental conditions affecting combustion within the work vehicle engine; and generate the first dynamically-adjusted power profile by repeatedly fitting the first profile shape beneath the EP ceiling as the EP ceiling moves along the vertical axis of the power/speed graph.

20. The work vehicle program product of claim 18, wherein the first default power profile and the first dynamically-adjusted power profile comprise a default power bulge profile and a dynamically-adjusted power bulge profile, respectively; and wherein the computer-readable instructions, when executed by the controller architecture, cause the controller architecture to utilize the dynamically-adjusted power bulge profile to determine the power output target ($PO_{TAR}$) in at least selected instances.

\* \* \* \* \*